(12) United States Patent
Nagasako et al.

(10) Patent No.: US 7,947,933 B2
(45) Date of Patent: May 24, 2011

(54) CERAMIC HEATER AND METHOD FOR MANUFACTURE THEREOF

(75) Inventors: Ryuichi Nagasako, Kirishima (JP);
Osamu Hamada, Kirishima (JP); Koji Sakamoto, Kirishima (JP)

(73) Assignee: Kyocera Corporation, Kyoto (JP)

( * ) Notice: Subject to any disclaimer, the term of this patent is extended or adjusted under 35 U.S.C. 154(b) by 1121 days.

(21) Appl. No.: 10/580,521

(22) PCT Filed: Nov. 24, 2004

(86) PCT No.: PCT/JP2004/017404
§ 371 (c)(1),
(2), (4) Date: Feb. 28, 2007

(87) PCT Pub. No.: WO2005/060311
PCT Pub. Date: Jun. 30, 2005

(65) Prior Publication Data
US 2007/0221661 A1    Sep. 27, 2007

(30) Foreign Application Priority Data

Nov. 25, 2003 (JP) ................. 2003-394820
Dec. 24, 2003 (JP) ................. 2003-428254
Jan. 28, 2004 (JP) ................. 2004-019876

(51) Int. Cl.
*H05B 3/44* (2006.01)
*H05B 3/00* (2006.01)

(52) U.S. Cl. ........ 219/544; 219/270; 219/537; 219/538; 219/541; 219/542; 219/543; 219/548; 219/552; 219/553; 338/322; 338/326; 338/327; 338/328; 338/22 R; 338/220; 228/110.1; 228/112.1; 228/180.1; 29/611; 361/264; 361/265; 361/266

(58) Field of Classification Search ................. 219/270, 219/537–8, 541–4, 548, 552–3; 228/110.1, 228/112.1, 180.1; 29/611; 361/264–266; 338/322, 326–8, 22 R, 220
See application file for complete search history.

(56) References Cited

U.S. PATENT DOCUMENTS

| 3,859,144 A * | 1/1975 | Basche et al. ............. 148/279 |
| 4,591,535 A | 5/1986 | Mizuhara |
| 4,834,863 A | 5/1989 | Yamada et al. |
| 4,938,805 A | 7/1990 | Haydon et al. |
| 6,131,796 A | 10/2000 | Kaja et al. |
| 6,284,985 B1 | 9/2001 | Naba et al. |
| 6,291,804 B1 | 9/2001 | Fujii |
| 6,354,484 B1 | 3/2002 | Sakuraba et al. |

FOREIGN PATENT DOCUMENTS

CN    85109085 A    8/1986

(Continued)

OTHER PUBLICATIONS

Korean language office action and its English translation for corresponding Korean application No. 10-2006-7010202.

(Continued)

*Primary Examiner* — Shawntina Fuqua
(74) *Attorney, Agent, or Firm* — DLA Piper LLP (US)

(57) ABSTRACT

A ceramic heater comprising a ceramic body, a heat generating resistor buried in the ceramic body, an electrode pad that is electrically connected to the heat generating resistor and is formed on the surface of the ceramic body and a lead member bonded onto the electrode pad.

10 Claims, 6 Drawing Sheets

FOREIGN PATENT DOCUMENTS

| | | | |
|---|---|---|---|
| CN | 1149083 A | | 5/1997 |
| EP | 0038584 | * | 10/1981 |
| EP | 0038584 A1 | | 10/1981 |
| EP | 0638656 A1 | | 2/1995 |
| GB | 2081155 | * | 2/1982 |
| GB | 2081155 A | | 2/1982 |
| JP | 04-317473 | | 11/1992 |
| JP | 06-001670 | | 1/1994 |
| JP | 07-025674 | | 1/1995 |
| JP | 11-257659 | | 9/1999 |
| JP | 11-329676 | | 11/1999 |
| JP | 11-354255 | | 12/1999 |
| JP | 2000-048934 | * | 2/2000 |
| JP | 2000178079 A | | 6/2000 |
| JP | 2000272976 A | | 10/2000 |
| JP | 2001-126852 | | 5/2001 |
| JP | 2002-146465 | | 5/2002 |
| JP | 2003-246545 | * | 9/2003 |
| JP | 2003-249545 | | 9/2003 |
| JP | 15-317908 | * | 11/2003 |
| JP | 2003-317908 | * | 11/2003 |
| JP | 2003-317911 | | 11/2003 |
| WO | 9418350 A1 | | 8/1994 |

OTHER PUBLICATIONS

European office action for corresponding European application No. 04820499.4-2214.

European search report for corresponding European application No. 04820499.4-2214.

Japanese language office action and its English language translation for corresponding Japanese application 2004019876.

Chinese language office action and its English language translation for corresponding Chinese application 200480034597.6.

* cited by examiner

CERAMIC HEATER AND METHOD FOR MANUFACTURE THEREOF

BACKGROUND OF THE INVENTION

1. Field of the Invention

The present invention relates to a ceramic heater used in an ignition or evaporation heater for various combustion apparatuses such as kerosene burning fan heater, heating element for various sensors, measuring instruments, electronic components, industrial equipment, home electric appliances, etc., water heater, heating element for air-fuel ratio sensor of automobile, carburetor heater for automobile, glow plug for internal combustion engine that quickly preheats an auxiliary combustion chamber when starting a diesel engine or during idling, or the like and a method for manufacturing the same.

2. Description of the Related Art

There have been various sheathed heaters comprising heat generating resistor consisting of a metal wire of high melting point embedded in a sheath made of a heat resistant metal and various ignition devices that utilize spark discharge, used as ignition or heating elements such as glow plug used for assisting quick starting of diesel engine. However, these heaters have such problems that it is difficult to quickly raising the temperature, and they are inferior in wear resistance and in durability. The ignition apparatuses, in particular, have such drawbacks as low reliability with regards to igniting without fail as well as the possibility of causing electromagnetic interference such as the noise generated at the time of ignition.

Accordingly, use of ceramic heaters have been increasing due to high heat transmission efficiency, capability to quickly raising the temperature, operation without electromagnetic interference, reliable ignition, high safety, high wear resistance and high durability. Ceramic heaters are used in wide applications such as the glow plug for internal combustion engine.

One type of ceramic heating element that is in common use is a ceramic heater comprising a heating element made of a metal having high melting point provided on the surface or inside of alumina ceramics member. This heater has a heat generating resistor made of a metal having high melting point such as W, Re or Mo buried in the ceramic member that is constituted from alumina as the main component as described in, for example, Patent Documents 1 through 4. The heat generating resistor is connected to lead members via electrode pad.

A ceramic heater having cylindrical shape is manufactured as described below. First, a ceramic core and a ceramic sheet are prepared. A paste of a metal having high melting point such as W, Re or Mo is printed on one side of the ceramic sheet thereby to form a heat generating resistor and a lead-out section. Then the ceramic sheet is wound around the ceramic core with the surface where the paste has been printed facing inside. When this assembly is fired to integrate, the ceramic heater is obtained.

The ceramic heater has a through hole formed therein, through which the electrode pad formed on the back surface of the ceramic sheet and the lead-out section are connected to each other. The through hole may be filled with an electrically conductive paste as required. The electrode pad 4 formed on the back surface of the ceramic sheet is connected with the lead members by means of a brazing material. The heat generating resistor is caused to generate heat by supplying electricity through the lead members.

While there is a type of ceramic heater 1 having external terminals pressed against the electrode pad without brazing lead members, the type of brazing the lead members is becoming dominant in the current trend of the market.

Since alumina ($Al_2O_3$) used as an electrically insulating material has low heat resistance and low strength at high temperatures, non-oxide ceramics, especially silicon nitride ceramics that is excellent in heat resistance, thermal shock resistance and oxidation resistance is also widely used. Silicon nitride ceramics is excellent in heat resistance, and has high strength at high temperatures, low heat capacity and good electrical insulation. Therefore, silicon nitride ceramics is used in wide applications to form the ceramic heating element that is capable of quick heating and is operated at high temperatures.

The silicon nitride ceramic heater has such a structure, for example, as described below. A substantially U-shaped heating element, leads and a lead-out section are embedded inside of a ceramic body formed from sintered silicon nitride in a round tube or cylindrical shape, and an end of the lead-out section is formed so as to be exposed on the surface of the ceramic body. As described in Patent Document 5, a metal plate made of Ni is bonded by means of a metal layer onto the lead-out section that is exposed at the end on the surface of the ceramic body, while the lead members are welded onto the metal plate made of Ni.

In case non-oxide ceramics such as silicon nitride is used, the leads are connected in a way different from the case of a ceramic heater formed from oxide ceramics such as alumina. When bonding a metal to ceramics, it is a common practice to metalize the ceramics surface by Mo—Mn method and, after plating the surface with Ni, the metal is bonded by brazing, active metal method, shrink fitting, pressure impregnation, glass welding process or other method. The Mo—Mn method and the active metal method, in particular, achieves relatively high strength of bonding without need for high precision treatment of the junction, and therefore have been employed in wide applications (See, Patent Documents 6 through 8). However, although the Mo—Mn method is widely applied to oxide ceramics represented by alumina, it is difficult to apply this method to non-oxide ceramics. As a result, non-oxide ceramics has been often bonded by the active metal method or the like.

Patent Documents
1. Japanese Unexamined Patent Publication (Kokai) No. 11-354255
2. Japanese Unexamined Patent Publication (Kokai) No. 11-257659
3. Japanese Unexamined Patent Publication (Kokai) No. 2001-126852
4. Japanese Unexamined Patent Publication (Kokai) No. 2002-146465
5. Japanese Unexamined Patent Publication (Kokai) No. 7-25674
6. Japanese Unexamined Patent Publication (Kokai) No. 4-317473
7. Japanese Unexamined Patent Publication (Kokai) No. 6-1670
8. Japanese Unexamined Patent Publication (Kokai) No. 11-329676

Particularly for the ceramic heater used in automobiles, lead members having high bonding strength is in demand. However, conventional ceramics heaters have such a problem that tensile strength of the lead members decreases due to thermal cycle during use. When the lead member that has been brazed is left to stand in atmosphere at a high temperature, brazing strength decreases significantly in some cases. Also in case there is a significant difference in the thermal expansion coefficient between the ceramic body and the metal member that bonds the lead, residual stress is generated around the junction during a cooling process, and the residual stress sometimes acts onto the surface of the brazing material or ceramic body thereby decreasing the bonding strength

SUMMARY OF THE INVENTION

Accordingly, an object of the present invention is to provide a ceramic heater that has high durability, by increasing the strength of bonding the lead member with the ceramic heater.

In order to achieve the object described above, the ceramic heater according to one aspect of the present invention comprises a heat generating resistor buried in a ceramic body, an electrode pad for supplying electricity to the heat generating resistor is formed on the surface of the ceramic body, a plating layer is formed by electroless plating on the surface of the electrode pad, and the lead members are bonded by means of the brazing material, while content of boron (B) in the surface of the plating layer of the electrode pad is controlled to 1% by weight or lower. It is preferable to control the content of carbon (C) in the surface of the plating layer to 10% by weight or lower.

The conventional ceramic heater is subjected to baking treatment conducted in a reducing atmosphere for bonding the lead member by means of brazing material. Temperature of the baking treatment is required to be 600° C. or higher so as to melt the brazing material. However, when the temperature becomes 600° C. or higher, boron (B) contained in the plating layer 5 that is formed on the surface of the electrode pad 4 reacts with nitrogen (N) that is contained in the reducing atmosphere, so as to form boron nitride (BN) 14 on the surface of the plating layer 5, as shown in FIG. 3. When the quantity of boron nitride 14 thus generated increases, flow of the brazing material 6 on the plating layer 5 is impeded. As a result, formation of favorable meniscus of the brazing material 6 is impeded, thus resulting in smaller area of contact of the brazing material. Consequently, stress generated due to the difference in the thermal expansion coefficient between the ceramic body 2 and the brazing material 6 is borne by a small contact area, thus leading to a lower tensile strength of the lead member 7 due to thermal cycle during use. Similarly, when an organic component contained in the plating layer 5 precipitates in the form of carbon (C) 15 onto the surface of the plating layer 5, the carbon 15 also impedes the flow of the brazing material 6.

According to the present invention, since content of boron (B) in the surface of the plating layer of the electrode pad is controlled to 1% by weight or lower, and the content of carbon (C) in the surface of the plating layer is preferably controlled to 10% by weight or lower, fluidity of the brazing material on the surface of the plating layer becomes better so that bonding strength of the lead member 7 can be improved.

Contents of boron and carbon in the surface of the plating layer can be reduced by applying heat treatment during the process of manufacturing the ceramic heater. Specifically, according to the method of manufacturing the ceramic heater of one aspect of the present invention, the electrode pad that supplies electricity to the heat generating resistor buried in the ceramic body is formed on the surface of the ceramic body, the plating layer is formed on the surface of the electrode pad, and the lead members are bonded by means of a brazing material, wherein the electrode pad is formed on the ceramic body that incorporates the heat generating resistor, the plating layer is formed on the surface of the electrode pad, surface treatment is applied, the lead members are placed via the brazing material, and the lead members are bonded by baking in a reducing atmosphere.

This manufacturing method decreases the boron content in the plating layer by applying heat treatment to the plating layer prior to the baking treatment that is conducted to bond the lead members by means of the brazing material. That is, boron is turned into boron oxide by the heat treatment, and the boron oxide is removed as the temperature rises. Carbon (organic matter) contained in the plating layer can also be removed. Therefore, baking treatment of the brazing material can be carried out after removing boron and the organic matter that are contained in the plating layer, so as to suppress the formation of boron nitride and carbon on the surface of the plating layer and improve the durability of tensile strength of the lead member. The heat treatment is preferably carried out at a temperature from 800 to 1200° C. in atmosphere having partial pressure of steam of 900 Pa or higher.

It is also preferable, when a primary plating layer is formed on the electrode pad, the lead member is secured by the brazing material onto the primary plating layer and a secondary plating layer is formed on the brazing material, that the brazing material forms a diffusion layer of 1 μm or more in depth in the secondary plating layer, and depth of a portion of the secondary plating layer where the brazing material has not diffused therein is 1 μm or more.

When the conventional ceramic heater was left to stand in a high temperature atmosphere after brazing the lead members, brazing strength decreased significantly in some cases. Observation of samples having the brazing strength decreased significantly showed cracks in the secondary plating layer that was formed to protect the brazed junction. Analysis of the secondary plating layer indicated that component of the brazing material diffused up to the surface layer.

After investigation of this problem, it was found that cracks can be effectively suppressed from occurring in the secondary plating layer and bonding strength of the lead member can be improved, when thickness of the layer in the secondary plating layer where the brazing material has diffused 1 μm or more and depth of a portion from the surface of the secondary plating layer where the brazing material has not diffused therein is 1 μm or more.

Grain size of the secondary plating layer is preferably 5 μm or less, which further improves durability against thermal cycle during use.

A ceramic heater according to another aspect of the present invention comprises a ceramic body formed from a non-oxide material with a metal plate bonded thereto via a brazing material, wherein the brazing material contains a metal as main component in constitution corresponding to 1200° C. or lower in liquidus and at least one kind of V, Ti Zr and Hf as active metal and proportion of oxide of the active metal in a reaction layer between the brazing material and the non-oxide ceramic material is in a range from 5 to 90 atomic %.

As the active metal contained in the reaction layer, it is preferable to contain at least one of nitride, silicate and carbide in addition to the non-oxide material described above. It is also preferable that main component of the brazing material is one of Ni, Au—Ni, Ag—Cu, Ag—Cu—In and Au—Cu. It is also preferable that proportion of oxide of the active metal in the reaction layer that exists from the interface between the non-oxide ceramic material and the brazing material to a depth of 0.1 μm is in a range from 0.5 to 90 atomic %.

Bonding operation using the brazing material is preferably carried out by, for example, applying a metal paste that contains the active metal described above in the form of element or hydrogen compound thereof having particle size in a range from 0.5 to 100 μm, and heat the paste in vacuum of 1.33 to 1.33×10⁻⁵ Pa.

In case the ceramic body has a shape of tube or cylinder and a curved metal plate is brazed onto the lead-out section, cracks can be suppressed from occurring due to residual stress and the ceramic heater having high reliability can be obtained when radius of curvature of the ceramic body in the lead-out section and radius of curvature of inner surface of the metal plate satisfy a certain relationship.

In the ceramic heater of the prior art, when subjected to durability test in which the lead-out section is repetitively heated to 450° C. and cooled down to 40° C. over 500 cycles for a long period of time, residual stress is generated around the brazed portion of the metal plate, thus leading to the development of cracks in the ceramic body around this area. This may eventually cause a lead fixture bonded to the metal plate to come off, or the heating element to be oxidized by oxygen entering through the cracks, thus resulting in deterioration of the durability of the ceramic heater, thus showing low long-term reliability.

When radius of curvature $R_1$ (mm) of the ceramic body in the lead-out section, radius of curvature $R_2$ (mm) of the inner surface of the metal plate and mean thickness t (mm) of the metal layer satisfy the relationship $-0.1 \leq (R_1 - R_2) < t$, bonding strength of the brazing material that contains the active metal can be prevented from decreasing due to stress generated by the difference in the thermal expansion coefficient between the ceramic body and the metal plate, and cracks can be prevented from occurring in the ceramic body, thus improving the durability. Thickness of the brazing material layer formed between the metal plate and the ceramic body in the periphery of the metal plate is preferably in a range from 30 to 150 μm.

Figure 1A:
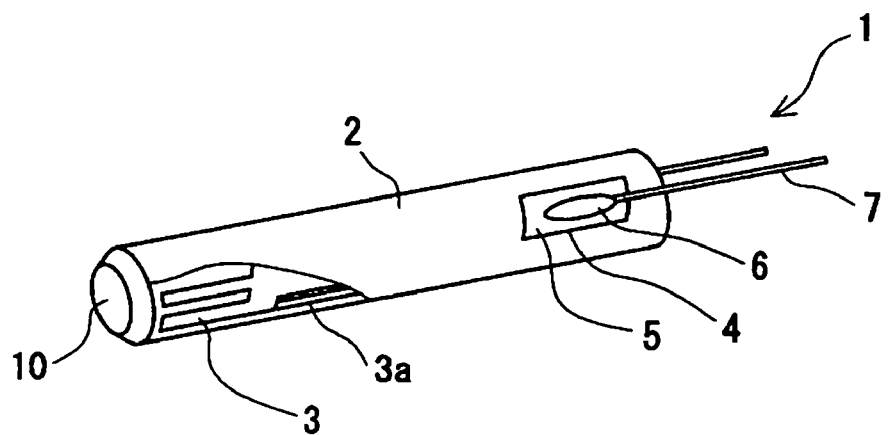
FIG. 1A is a partially cutaway perspective view of a ceramic heater according to first embodiment of the present invention.

| [DESCRIPTION OF REFERENCE NUMERALS] | |
|---|---|
| 1: | Ceramic heater |
| 2: | Ceramic body |
| 3: | Heating element |
| 4: | Electrode pad |
| 5: | Primary plating layer |
| 6: | Brazing material |
| 7: | Lead member |
| 8: | Secondary plating layer |
| 9: | Ceramic sheet |
| 10: | Ceramic core |
| 22: | Ceramic body |
| 23a: | Heating element |
| 23b: | Secondary lead |
| 23c: | Lead wire |
| 23d: | Lead-out section |
| 24: | Brazing material layer |
| 25: | Metal plate |
| 27: | Lead member |

DETAILED DESCRIPTION OF THE INVENTION

Embodiments of the ceramic heater according to the present invention will be now described with reference to the accompanying drawings.

First Embodiment

Figure 1B:
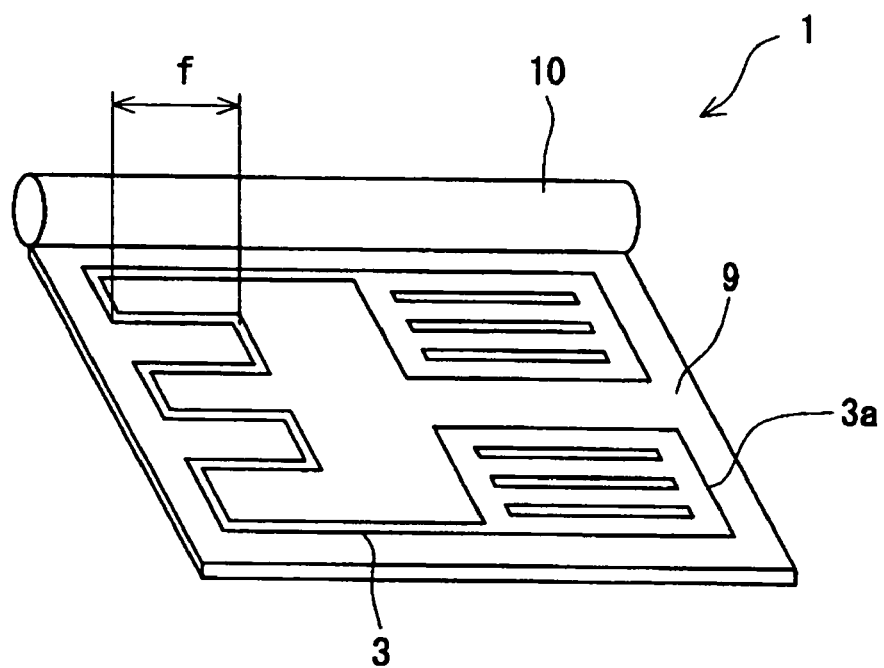
FIG. 1B is an exploded view of the ceramic heater shown in FIG. 1A.

FIGS. 1A and 1B show the first embodiment of the ceramic heater of the present invention. FIG. 1A is a partially cutaway perspective view of the ceramic heater 1, and FIG. 1B is an exploded view of a part of the ceramic body 2.

The ceramic heater 1 has a heat generating resistor 3 buried in the ceramic body 2, and an electrode pad 4 that electrically connects to the end of the heat generating resistor 3 formed on the surface of the ceramic body 2 as shown in FIG. 1A. The electrode pad 4 has a plating layer 5 formed thereon and a lead member 7 connected thereto via a brazing material 6.

The ceramic heater 1 has such a constitution as a ceramic sheet 9 is wound around a ceramic core 10, as shown in FIG. 1B. The heat generating resistor 3 and a lead-out section 3a are formed on the surface of the ceramic sheet 9, and are connected via a through hole to the electrode pad 4 that is formed on the back side of the ceramic sheet 2. The ceramic sheet 9 is wound around the ceramic core 10 so that the heat generating resistor 3 faces the inside and is fired thereby making the ceramic body 2 that incorporates the heat generating resistor 3 therein.

The ceramic heater 1 has a shape of, for example, cylinder measuring 2 to 20 mm in diameter and 40 to 200 mm in length, while the dimensions are preferably 2 to 4 mm in diameter and 40 to 65 mm in length when used for heating an air fuel ratio sensor of automobile.

The ceramic sheet 9 that constitutes the ceramic body 2 is formed from a ceramic material such as alumina ceramics, silicon nitride ceramics, aluminum nitride ceramics or silicon carbide ceramics. In case the ceramic sheet 9 is formed from alumina ceramics, it is preferably constituted from 88 to 95% by weight of $Al_2O_3$, 2 to 7% by weight of $SiO_2$, 0.5 to 3% by weight of $CaO$, 0.5 to 3% by weight of $MgO$ and 1 to 3% by weight of $ZrO_2$. When $Al_2O_3$ content is less than 88% by weight, proportion of glass content becomes higher and gives rise to the possibility of migration occurring when electric current is supplied. When $Al_2O_3$ content exceeds 95% by weight, insufficient quantity of glass content diffuses into the metal layer of the heat generating resistor 3 that is buried in the ceramic body 2, and durability of the ceramic heater 1 may become lower.

Figure 1C:
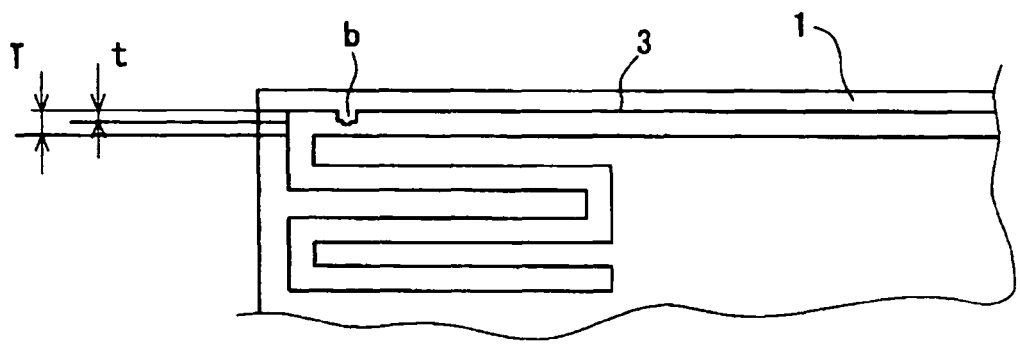
FIG. 1C is a partially enlarged plan view of a ceramic sheet.

The ceramic body 2 incorporates the heat generating resistor 3 that contains metal having high melting point such as W, Mo and Re as the main component. In case the heat generating resistor 3 is damaged to have a defect b as shown in FIG. 1C, width t of the defect is preferably not larger than one half of strip width T of the heat generating resistor. When the width t of the defect is larger than one half of strip width T of the heat generating resistor, the portion that is made narrower by the defect is subjected to localized heating with higher resistance of the heat generating resistor 3, thus lowering the durability.

Such a defect may be generated, for example, by dust deposited on a print block used in printing the heat generating resistor 3, or foreign matter that has mixed in the printed material of the heat generating resistor and is lost by burning. The printing process and the bonding process include steps of having the green ceramic sheet 9. It is important to carry out such steps in clean environment so as to prevent the defects from occurring and, in case defect should be generated, to implement inspection to reject defects larger than a certain size.

When used in a heater for an automobile, the heat generating resistor 3 preferably has a heat generating section having length from 3 to 15 mm. When the heat generating section is shorter than 3 mm, although the temperature can be raised quickly by flowing current, durability of the ceramic heater 1 becomes lower. When the heat generating section is longer than 15 mm, it becomes slower to raise the temperature, and an attempt to increase the rate of heating results in greater power consumption by the ceramic heater 1.

The length of the heat generating section refers to the length f of a section between bends of cranked shape of the heat generating resistor 3 shown in FIG. 1B. The length f may be selected according to the application.

The lead-out sections 3a are formed at both ends of the heat generating resistor 3. The lead-out sections 3a that are formed at both ends of the heat generating resistor 3 are connected to the electrode pad 4 via the through hole (not shown). The electrode pad 4 is formed from a metalized layer containing a metal having high melting point such as W, Mo and Re has the main component.

Figure 2A:
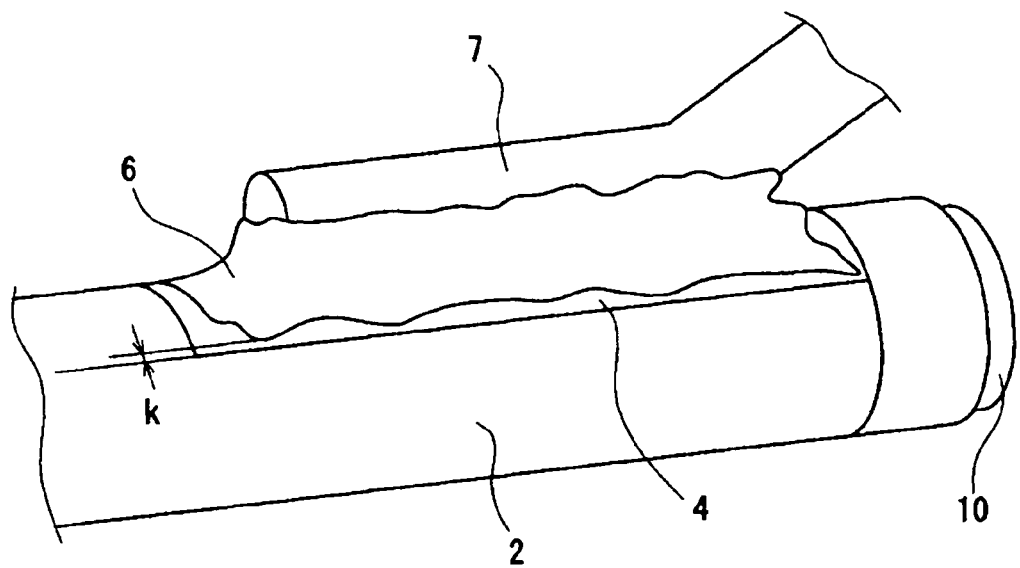
FIG. 2A is a partially enlarged perspective view showing a lead connecting portion of the ceramic heater shown in FIG. 1A.
Figure 2B:
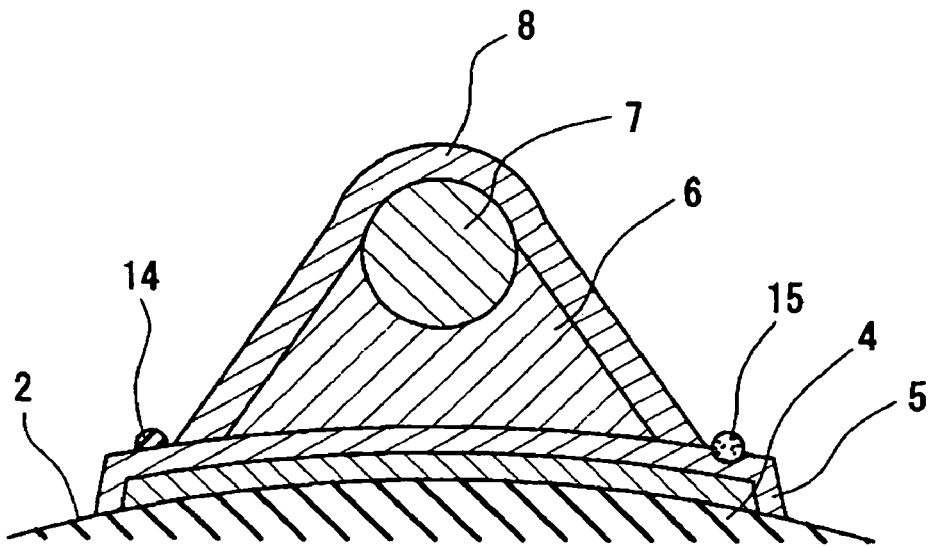
FIG. 2B is a partially enlarged sectional view showing the lead connecting portion of the ceramic heater shown in FIG. 1A.

FIGS. 2A and 2B are partially enlarged diagrams showing the structure around the electrode pad 4. As shown in FIGS. 2A and 2B, the plating layer 5 is formed to a thickness of 1 to 5 μm from at least one of Ni, Cr, Cu, Pt, Au, Co, Sn, Pd, etc., on the surface of the electrode pad 4, and the lead member 7 is connected to the plating layer 5 via the brazing material 6.

The plating layer 5 is preferably formed by electroless plating, because the plating layer 5 tends to have uneven thickness when formed by electroplating. That is, plating layer 5 is formed by applying an electric field to the base material to be plated in the case of electroplating, which may cause significant variation in thickness due to the current density distribution when the electric field is applied. With electroless plating, in contrast, the plating layer 5 can be formed with uniform thickness. Whether the plating layer 5 is electroless plating or not can be determined by checking the variation in thickness. While plating materials based on phosphorus (P) or boron (B) are commonly used in electroless plating, a material based on phosphorus is inferior to a material based on boron in heat resistance. Therefore, the plating layer 5 of the ceramic heater 1 is preferably based on boron.

It is important to control the content of boron (B) in the surface of the plating layer 5 formed on the electrode pad 4 to 1% by weight or lower in the ceramic heater 1. This is because a small amount of boron (B) contained in the plating layer 5 causes a decrease in the bonding strength of the lead member due to the following mechanism. When the lead member 7 is bonded onto the plating layer 5 via the brazing material 6, the junction is baked in a reducing atmosphere so as to prevent the electrode pad 4, the brazing material 6 and the lead member 7 from being oxidized. Consequently, nitrogen ($N_2$) contained in the reducing atmosphere and boron contained in the plating layer 5 react with each other and form boron compounds such as boron nitride (BN) 14 and boron oxide ($B_2O_3$) on the surface of the plating layer. When much boron nitride 14 is formed on the surface of the plating layer, boron nitride 14 that has low wettability with the brazing material 6 lowers the fluidity of the brazing material 6 that is used for bonding the lead member 7, and impedes the brazing material 6 from forming favorable meniscus. As a result, contact area between the lead member 7 and the brazing material 6 decreases, bonding strength of the lead member 7 decreases thus resulting in lower durability of the ceramic heater.

Accordingly, formation of boron nitride 14 is suppressed as shown in FIG. 2B by controlling the content of boron (B) in the surface of the plating layer 5 to 1% by weight or less. This enables it to increase the contact area between the plating layer 5 and the brazing material 6 thereby to firmly connect the lead member 7. The content of boron in the surface of the plating layer is preferably 0.3% by weight, and more preferably 0.1% by weight or less.

The content of boron in the surface of the plating layer 5 can be measured by Auger spectroscopy analysis. For example, surface of the object is irradiated with electron beam of 5 kV and 10 nA and Auger electrons released due to this excitation are analyzed so as to quantitatively analyze the components contained in the extremely shallow region about several nanometers from the surface. Auger spectroscopy analysis enables it to measure the component without destructing the ceramic heater. By controlling the content of boron measured by Auger spectroscopy analysis to 1% by weight or less, quantity of boron nitride formed on the surface of the plating layer 5 can also be controlled within such an extent that does not inhibit the bonding of the brazing material 6. Based on molecular weight 10.82 of B and molecular weight 24.828 of BN, quantity of boron nitride can be given as follows assuming that all of boron detected in the surface of the plating layer 5 is in the form of boron nitride 14.

Quantity of BN (% by weight)=Quantity of B×(24.828/10.82) As a result, when the content of boron in the surface of the plating layer is 1% by weight or less, quantity of boron nitride precipitated on the surface becomes not higher than 2.3% by weight, and is kept within such an extent that does not decrease the contact area with the brazing material 6.

It is also preferable to control the content of carbon (C) on the surface of the plating layer 5 to 10% by weight or less. This improves fluidity of the brazing material on the surface of the plating layer 5, thereby improving durability of the tensile strength of the lead member 7. Carbon 15 is formed on the surface of the plating layer 5 similarly to boron nitride 14. Carbon 15 is supposedly formed from organic matter that is taken into the plating layer 5 when forming the plating layer 5 and organic matter deposited on the surface during the process following the plating. Carbon 15 also has low wettability with the brazing material 6 similarly to boron nitride 14. As a result, presence of carbon 15 on the surface of the plating layer 5 causes low fluidity of the brazing material 6, thus creating a cause of durability of the tensile strength of the lead member 7 to become lower. Content of carbon 15 on the surface of the plating layer is more preferably 2.5% by weight or less. Content of carbon 15 on the surface of the plating layer 5 can also be measured by Auger spectroscopy analysis.

Contents of boron and carbon on the surface of the plating layer 12 can be controlled, for example, by applying heat treatment after forming the plating layer 5 on the surface of the electrode pad 4 of the ceramic body 2 that incorporates the heat generating resistor 3. That is, when the plating layer 5 is subjected to heat treatment before baking the lead member 7 bonded by the brazing material 6, boron contained in the plating layer can be oxidized and removed. Specifically, boron contained in the plating layer 5 and oxygen in the atmosphere react to form boron oxygen, and the temperature is raised thereby to remove boron oxygen. At the same time, organic matter that is the source of carbon existing in the plating layer 5 can also be oxidized and removed. In this way, by removing boron and organic matter contained in the plating layer 5 in advance, quantities of boron nitride 14 and carbon 15 created on the surface of the plating layer 5 when baking the brazing material 6 can be suppressed thereby to improve durability of the tensile strength of the lead member 7.

The heat treatment is preferably carried out at a temperature from 800 to 1200° C. in a reducing atmosphere having partial pressure of steam of 900 Pa or higher. When the temperature is lower than 800° C., boron and oxygen do not react sufficiently and boron remains in the plating layer 5. When the temperature is higher than 1200° C., there is a possibility that metal component of the plating layer 5 and metal component of the electrode pad 4 react with each other thereby forming a metal compound around the electrode pad 4. When the partial pressure of steam is lower than 900 Pa, there occurs shortage in oxygen content in the atmosphere, resulting in insufficient oxidization of boron that is contained in the plating layer 5, thus making boron likely to remain in the plating layer 5. When the partial pressure of steam is excessively high, the electrode pad 4 and the plating layer 5 may be oxidized. In case W is used to form the electrode pad 4 and Ni is used to form the plating layer 5, the process can be carried out in an atmosphere having partial pressure of steam of up to about 6000 Pa.

The organic matter contained in the plating layer 5 can also be removed by applying heat treatment in a reducing atmosphere having such a level of partial pressure of steam as described above. Accordingly, quantity of carbon formed on the surface of the plating layer 5 can be decreased.

On the plating layer 5, the plating layer is coated with the brazing material 6 so as to bond with the lead member 7. The brazing material 6 may be constituted from Ag—Cu, Au—Cu, Ag, Cu, Au or the like as the main component, with a resin contained as a binder and a metal such as Ti, Mo, V or the like contained as active metal as required.

Temperature of the baking treatment can be set at around 1100° C. by controlling the Au content in a range from 25 to 95% by weight in case the brazing material 6 made of Au—Cu is used, or by controlling the Au content in a range from 50 to 95% by weight in case the brazing material 6 made of Au—Ni is used. As a result, residual stress caused by the baking treatment can be reduced. This makes tensile strength of the lead member 7 less likely to decrease due to fatigue caused during the thermal cycle by the difference in thermal expansion coefficient between the brazing material 6 and the ceramic body 2.

While the lead member 7 may be formed from Ni, Fe—Ni—Co alloy, 4-2 alloy, Fe—Ni alloy, stainless steel or the like, it is preferable to use Ni-based alloy or Fe—Ni alloy that has high heat resistance. Use of such a material enables it to effectively prevent the lead member 7 from deteriorating from rising temperature due to the heat transmitted from the heat generating resistor 3. The lead member 7 may be formed in various shapes such as a wire having circular cross section, plate-shaped wire or block.

In case the lead member 7 is made of Ni-based alloy or Fe—Ni alloy, mean crystal grain size is preferably not larger than 400 µm. When mean crystal grain size is preferably larger than 400 µm, the lead member 7 is susceptible to fatigue in a portion near the junction due to vibration and thermal cycle during operation, thus resulting in cracks. In case the lead member 7 is made of other material, stress tends to be concentrated in grain boundary in a region near the interface between the brazing material 6 and the lead member 7 leading to cracks, when the crystal grain size of the material that forms the lead member 7 is larger than thickness of the lead member 7.

When bonding the lead member 7 using the brazing material 6, baking treatment called brazing is carried out. The baking treatment is preferably carried out at as low temperature as possible in as short time as possible, in order to keep the mean crystal grain size of the lead member 7 within 400 µm and prevent the strength of the lead member 7 from decreasing.

It is preferable to form a secondary plating layer 8 on the surface of the brazing material 6 that bonds the lead member 7, in order to prevent the brazing material from being oxidized. In case the secondary plating layer 8 is not formed on the surface of the brazing material 6, it is preferable to apply plating over the entire region of the lead member 7.

Now a method for manufacturing the ceramic heater 1 having the constitution described above will be described.

A ceramic slurry that contains alumina as the main component and contains 4 to 12% by weight in total of $SiO_2$, CaO, MgO and $ZrO_2$ as the sintering additive is formed in order to obtain the ceramic sheet 9. The heat generating resistor 3 and the lead-out section 3a are formed on one principal surface of the ceramic sheet 9 by printing or transferring process, and the electrode pad 4 is formed on the other principal surface opposite to that where the lead-out section 3a is formed, by printing or transferring process.

Then a through hole (not shown) is formed between the lead-out section 3a and the electrode pad 4. The lead-out section 3a and the electrode pad 4 are electrically connected with each other by filling the through hole with, or coating the inner surface of the through hole with an electrically conductive material constituted from at least one kind of W, Mo and Re as the main component.

Then, after forming a coating layer having substantially the same composition as that of the ceramic sheet 9 on the heat generating resistor 3 and the lead-out section 3a, the ceramic sheet 9 is wound around the ceramic core 10 in close contact therewith, thereby to form a cylindrical green compact. The green compact is fired in a reducing atmosphere at a temperature from 1500 to 1650° C. so as to make the ceramic body 2.

Surface of the electrode pad 4 is coated with the plating layer 5 formed by electroless plating process from at least one kind of metal such as Ni, Cr, Pt, Au, Pd and Cu.

The plating layer 5 is subjected to heat treatment at a temperature from 800 to 1200° C. in a reducing atmosphere including partial pressure of steam of 900 Pa or higher. The heat treatment removes boron and organic matter contained in the plating layer 5.

Then the lead member 7 is bonded by the brazing material 6 onto the plating layer 5, and is baked in a reducing atmosphere that contains oxygen, thereby to complete the ceramic heater 1. Temperature of the baking treatment is preferably in a range from 770 to 870° C. in the case of Ag—Cu brazing material, in a range from 950 to 1050° C. in the case of Au—Cu brazing material and in a range from 1000 to 1100° C. in the case of Ag brazing material.

In case the ceramic heater 1 is used in an atmosphere having high humidity, migration can be suppressed by using the brazing material 6 based on Au or Cu. It is preferable that distance k between the end of the electrode pad 4 and the end of the brazing material 6 is 0.2 mm or larger as shown in FIG. 2A. When the distance k is less than 0.2 mm, the edge of the electrode pad 4 is pulled and is prone to peel-off as the brazing material 6 shrinks, thus resulting in lower tensile strength of the lead member 7.

As the baking treatment is applied so as to bond the lead member 7 via the brazing material 6 after applying heat treatment to the plating layer 5 formed on the surface of the electrode pad 4 in the reducing atmosphere containing water vapor, fluidity of the brazing material 6 over the plating layer 5 is improved and tensile strength of the lead member 7 can be prevented from decreasing due to oxidation of the brazing material 6 caused by the thermal cycle during operation.

Second Embodiment

In this embodiment, an example will be described where reliability of the lead member in the junction thereof is improved by controlling the diffusion of the brazing material component into the secondary plating layer that is formed on the brazing material.

The process is similar to that of the first embodiment up to the point of winding the ceramic sheet 9 around the ceramic core 10 to form the ceramic body 2. Then as shown in FIG. 2B, the primary plating layer 5 is formed on the electrode pad 4 of the ceramic heater 1 after firing. The primary plating layer 5 is provided for the purpose of increasing the strength of brazing by improving the fluidity of the brazing material when brazing the lead member 7 onto the electrode pad 4. The primary plating layer 5 is typically formed to a thickness in a range from 1 to 5 μm. The primary plating layer 5 may be formed from Ni, Cr or a composite material containing the former as the main component.

When forming the primary plating layer 5, it is preferable to employ electroless plating in order to control the plating thickness. When electroless plating is employed, immersing the base material in an activation solution that contains Pd as a pre-treatment for plating causes the primary plating layer 10 to be formed so as to substitute Pd as the seed on the electrode pad 7.

Then the lead member 7 is bonded onto the primary plating layer 5 by means of the brazing material 6. Setting the brazing temperature to around 1000° C. is advantageous since it decreases the residual stress generated after brazing. The brazing material may be constituted from Au, Cu, Au—Cu, Au—Ni, Ag or Ag—Cu. Ag—Cu brazing material containing 71 to 73% by weight of Ag has eutectic structure which prevents an alloy of different composition from being created when the temperature is raised or lowered during brazing, thus making it possible to decrease the residual stress generated after brazing. It is preferable to use the brazing material 6 based on Au or Cu since it makes migration less likely to occur when used in an atmosphere having high humidity.

Figure 3:
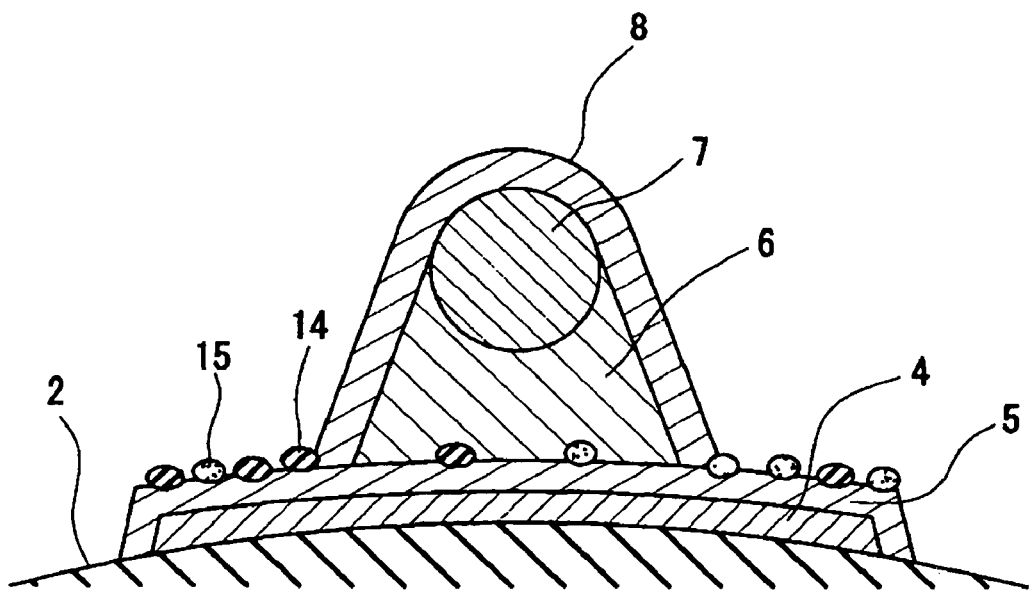
FIG. 3 is a partially enlarged sectional view showing a lead connecting portion of a ceramic heater of the prior art.
Figure 4:
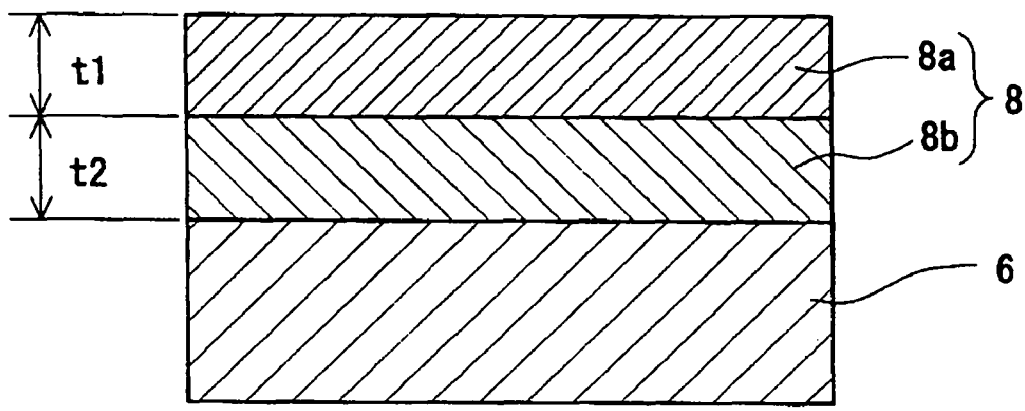
FIG. 4 is a partially enlarged sectional view showing a junction between a brazing material 6 and a plating layer 8.

A secondary plating layer 8 is formed from Ni or the like on the surface of the brazing material 6 in order to improve durability at high temperatures and protect the brazing material 8 from corrosion. FIG. 3 is a partially enlarged sectional view showing a portion near the interface between the brazing material 6 and the secondary plating layer 8. As shown in FIG. 3, the secondary plating layer 8 contains a layer 8a where the component of the brazing material 6 is not diffused and a layer 8b where the component is diffused. According to this embodiment, cracks are suppressed from occurring in the secondary plating layer by controlling the thickness of the layer 8a where the component is diffused and the layer 8b where the component is not diffused, thereby improving the reliability of the ceramic heater.

In the secondary plating layer, it is preferable to control the thickness $t_1$ of the layer 8a where the component of the brazing material is not diffused to 1 μm or more from the surface of the secondary plating layer. When the thickness $t_1$ of the layer 8a where the component of the brazing material is not diffused is less than 1 μm, function of the secondary plating layer to protect the brazing material cannot be fully achieved. When the brazing material 6 based on Ag—Cu is used and the secondary plating layer is formed from Ni, for example, Cu component of the brazing material 6 and nickel contained in the secondary plating layer 8 form a solid solution that has lower melting point. Specifically, while heat treatment causes nickel contained in the secondary plating layer 8 and Cu component of the brazing material 6 to form a 100% solid solution, the solid solution has a melting point lower than that of pure nickel and therefore melting point of the secondary plating layer as a whole decreases. When the melting point of the secondary plating layer decreases, cracks tend to occur in the secondary plating layer 8 when the ceramic heater 1 is left at a high temperature, thus allowing oxygen to enter through the cracks and oxidize the brazing material 6, thus resulting in lower strength of the portion that has been brazed. In case the brazing material 6 made of Ag—Cu is used, Cu diffuses into the secondary plating layer 8 but Ag does not react with Ni and therefore hardly diffuses into the secondary plating layer 8.

It is preferable to control the thickness $t_2$ of the layer 8b in the secondary plating layer where the component of the brazing material is diffused to 1 μm or more. This is for the purpose of improving the adhesiveness of the brazing material 6 and the secondary plating layer 8, thereby to prevent the plating layer from coming off.

The amount of the component of the brazing material 6 diffusing into the secondary plating layer 8 can be controlled by changing the temperature of heat treatment conducted after forming the secondary plating layer 8. The purpose of applying heat treatment after forming the secondary plating layer 8 is to improve the adhesiveness of the brazing material 6 and the secondary plating layer 8. The amount of the component of the brazing material 6 diffusing into the secondary plating layer 8 can be decreased by lowering the heat treatment temperature.

Thickness of the secondary plating layer 8 is preferably in a range from 2 to 10 μm. This is because sufficient oxidization resistance cannot be achieved when the thickness is less than 2 μm, and durability becomes lower due to the difference in thermal expansion coefficient between the metalized layer and the ceramics when the thickness is more than 10 μm.

Thickness of the layer 8a where the component of the brazing material is diffused and the layer 8b where the component is not diffused in the secondary plating layer can be measured by Auger electron spectroscopy analysis. For example, scanning type FE Auger electron spectroscopy analyzer Model 680 manufactured by PHI was used to make measurement at the center of the meniscus of the brazing material under conditions of 5 kV in acceleration voltage and 10 nA in sample current.

In order to improve durability, it is preferable to control the grain size of the crystal that constitutes the secondary plating layer 8 to within 5 μm. When the grain size is larger than 5 μm, strength of the secondary plating layer 8 become weak and brittle, and cracks tend to occur when left to stand in atmosphere at a high temperature. It is believed that denser plating layer can be formed while preventing microscopic defects from being formed, when the grain size of the crystal grains that constitutes the secondary plating layer 8 is smaller.

Grain size of the crystal that constitutes the secondary plating layer 8 can be measured by means of SEM (×1000 to 3000). For example, a straight line is drawn arbitrarily on a photograph taken with SEM and length of a portion of the line lying across a grain is measured for 50 or more grains, so as to determine the mean grain size by averaging the measurements. The secondary plating layer 8 is preferably formed from Ni by electroless plating using boron-based reducing agent. Phosphorus-based reducing agent may also be used instead of boron-based reducing agent. In case operation at high temperatures is expected, it is preferable that the secondary plating layer 8 is formed from Ni by electroless plating using boron-based reducing agent. Grain size of the secondary plating layer 8 can be controlled by changing the temperature of heat treatment conducted after forming the secondary plating layer 8. Grain size becomes larger when the temperature of heat treatment is made higher.

The lead member 7 is preferably formed from Ni-based or Fe—Ni-based alloy that has high heat resistance, in order to prevent deterioration due to temperature rise of the lead member 7 during operation caused by heat transmitted from the heat generating resistor 4.

In order to keep variation among the samples small, the heat treatment during brazing is preferably carried out at a high temperature with a sufficient margin over the melting point of the brazing material 6.

What has been described in this embodiment applies regardless of the type of ceramics, and also applies to any case where brazing with Au-based material is carried out in addition to the ceramic heater. Shape of the ceramic heater 1 may also be plate shape in addition to tube and cylinder.

Third Embodiment

Figure 5A:
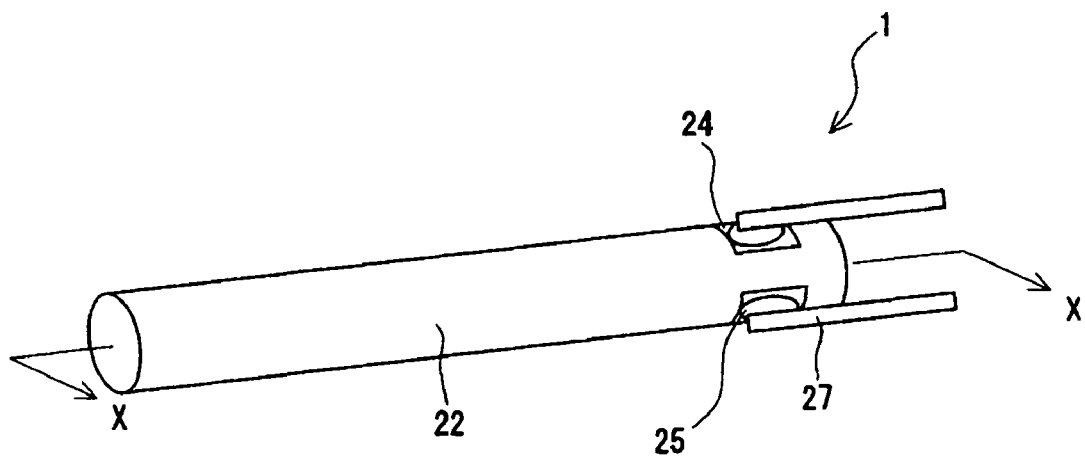
FIG. 5A is a perspective view of a ceramic heater according to third embodiment of the present invention.
Figure 5B:
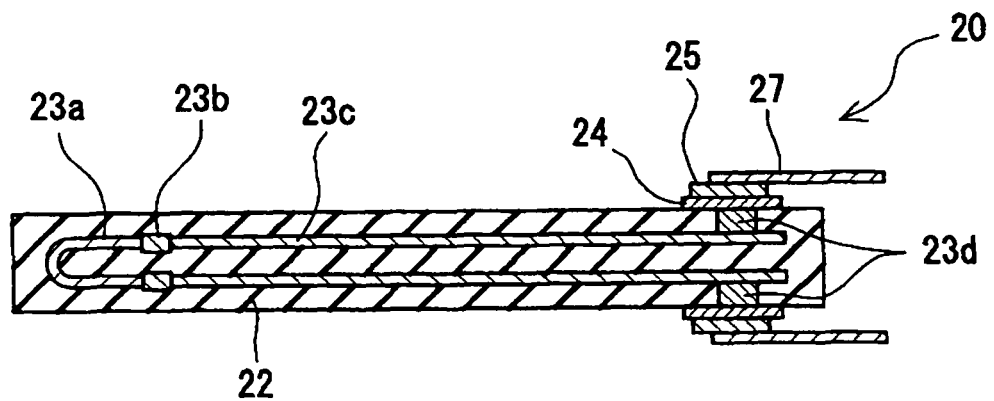
FIG. 5B is a sectional view along line X-X of the ceramic heater shown in FIG. 5A.

In this embodiment, an example of ceramic heater comprising a ceramic body made of non-oxide ceramics will be described. FIG. 5A is a perspective view showing the ceramic heater 1 of this embodiment, and FIG. 5B is a sectional view thereof along line X-X.

The ceramic heater 1 comprises a ceramic body 22 formed from sintered silicon nitride in a cylindrical shape, wherein a heating element 23a formed from WC as the main component in substantially U shape, a second lead section 23b connected thereto, a lead section 23c electrically connected to an end of the second lead section and an lead-out section 23d that is connected to the second lead section 23c and is exposed at the end opposite to the connected end are embedded in the ceramic body 22. The lead section 23c is constituted from an electrically conductive material containing WC as the main component, a W wire or a combination thereof, while resistance is controlled to a low level so as to heat generated thereby when current flow becomes less than that from the heat element 23a.

Figure 6:
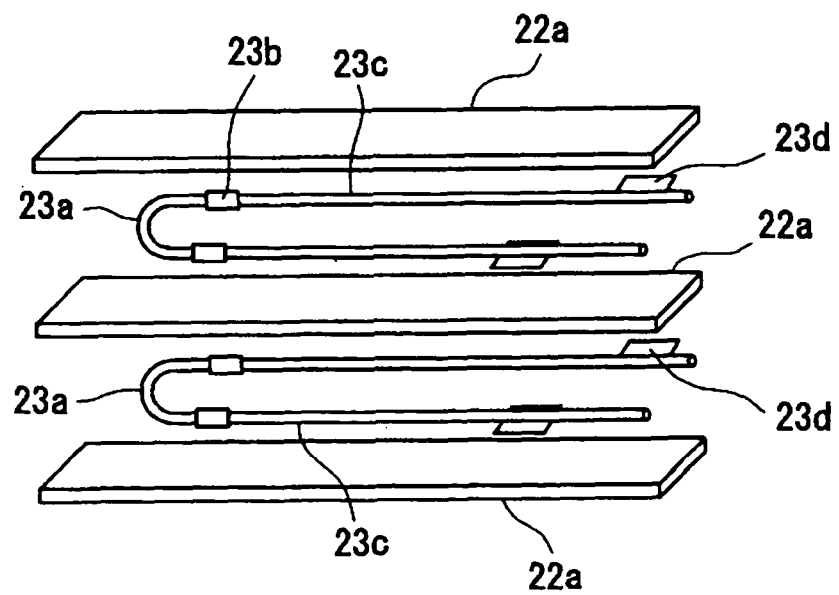
FIG. 6 is an exploded view explanatory of a method for manufacturing the ceramic heater shown in FIGS. 5A and 5B.

FIG. 6 is an exploded view showing a method for manufacturing the ceramic body 22. The heating element 23a, the second lead section 23b, the lead section 23c and the lead-out section 23d are placed successively on the surface of the ceramic green compact 22a, which is stacked in two layers over which another ceramic green compact 22a is placed and integrated into a single body by hot press firing. Then the sintered body is machined into cylindrical shape thereby to make a ceramic body 4.

The heating element 23a provided in the ceramic body 22 that constitutes the ceramic heater may be formed in any shape. For example, the heating element 23a may be formed in block shape that looks like U shape or W shape when viewed from above, or into a layer. The heating element 23a may be formed on the ceramic body 22 by printing or transferring process. Alternatively, wire-shaped heating element 23a may be wound in a coil shape or bent and embedded in the ceramic body 22.

Now by making reference again to FIG. 5B, a metal plate 25 is connected via a brazing material 24 to one end of the ceramic body 22. A lead fixture 27 is connected to the metal plate 25. The brazing material 24 that connects the metal plate 25 is formed so as to electrically connect to the lead-out section 23d that is exposed from the ceramic body 22. The brazing material 24 is required to be capable of achieving a high bonding strength with the ceramic body 22 that is formed from non-oxide ceramics.

Figure 7:
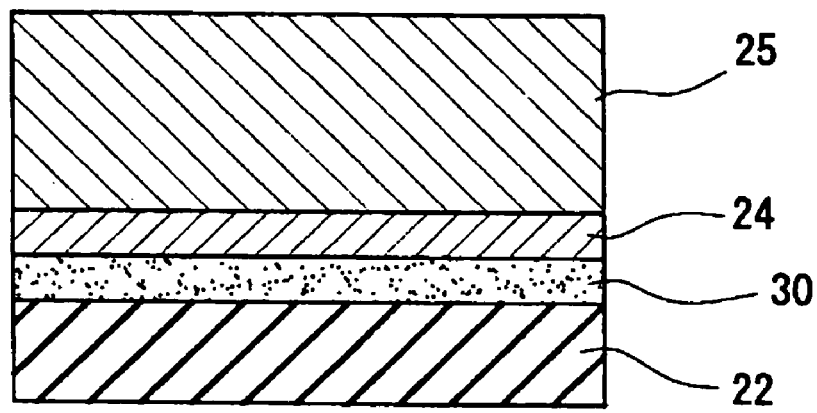
FIG. 7 is a partially enlarged sectional view showing a junction between a ceramic body 22 and a metal plate 25.

In this embodiment, therefore, a reaction layer is formed between the ceramic body 22 and the brazing material while using the brazing material 2 that contains a predetermined active metal element. FIG. 7 is a partially enlarged sectional view showing a junction between the ceramic body 22 and the brazing material 24. As shown in FIG. 7, the brazing material 24 that contains an active metal element is applied to the surface of the ceramic body 22 and the reaction layer 30 is formed between the ceramic body 22 and the brazing material 24. Thereby, the ceramic 24 and the metal plate 24 can be firmly bonded.

In order to achieve such a junction structure, the inventors of the present application investigated as follows. A paste was made from a powder mixture containing 1 to 30% by weight, preferably 2 to 10% by weight, of V or hydrogen compound of V used as the active metal and the rest consisting of Ni powder, and an organic binder. The ceramic body 22 made of sintered silicon nitride was coated with the paste by screen printing or dipping method. The ceramic body 22 was then heated to about 1050° C. in vacuum and was held at this temperature for 15 minutes, and the reaction layer 30 was formed on the surface of the ceramic body 22. Thus such a junction as shown in FIG. 7 can be obtained by arranging so that the brazing material layer 24 (based on Au—Ni, Ag—Cu, etc.) is formed between the reaction layer 30 and the metal member 25.

Since it is necessary to keep the baking temperature in vacuum to 1200° C. or lower, it is preferable that the metal as main component of the brazing layer 24 having constitution corresponding to 1200° C. or lower in liquidus is used.

Content of oxide of the active metal element in the reaction layer 30 is preferably in a range from 5 to 90% by weight. When the content of oxide of the active metal element in the reaction layer 30 is more than 90% by weight, the junction has low bonding strength and may come off in the interface of bonding under external force. Keeping the oxide content to below 5%, on the other hand, requires a complicated treatment of the active metal powder and complex heat treatment conditions in vacuum, and very high manufacturing cost. Preferably, content of oxide in the reaction layer 30 is controlled in a range from 5 to 50%, in order to achieve more stable junction.

Content of oxide of the active metal element in the reaction layer 3 can be determined from the proportion of the peak intensity from the reaction product by examining the state of reaction of the active metal element in the reaction layer 30 by ESCA method.

Behavior of Ni and the active metal V deposited on the surface of the ceramic body 22 during the heat treatment in vacuum is supposedly as follows. The active metal V that has high reactivity and in contact with the surface of the ceramic body 22 reacts with silicon nitride ($Si_3N_4$) and forms vanadium silicate ($V_3Si_5$, $VSi_3$) and vanadium nitride (VN). Free Si generated by this reaction and Ni powder react with each other so as to form nickel silicate (NiSi, etc.) that has a low melting point. The reaction described above proceeds further in the liquid phase of this nickel silicate that has low melting point. As a result, the active metal V is concentrated on the surface of the ceramic body 22, with a dense reaction layer consisting of vanadium silicate and vanadium nitride being formed thereon, and the metal layer consisting of Ni particles coated with nickel silicate is formed on the reaction layer.

For the reaction layer 30 to be formed, it is necessary at the first that active metal V that has high reactivity reacts with silicon nitride to form vanadium silicate and vanadium nitride. It was found that heat treatment in vacuum is effective in causing this reaction to fully proceed. In case the heat treatment is carried out in air atmosphere, active metal V that has high reactivity first reacts with oxygen contained in the atmosphere. This results in shortage of active metal V that reacts with silicon nitride, leading to a problem of unstable bonding strength. However, in the ordinary manufacturing conditions, it is difficult to completely prevent oxide from being formed through the reaction of the active metal and oxygen. Therefore, it is preferable to keep the content of oxide formed by the reaction of the active metal and oxygen in the reaction layer 30 in a range from 5 to 90%, more preferably from 5 to 50%, as described above.

The reaction product of the active metal element and ceramics in the reaction layer 30 is preferably at least one kind of nitride, silicate and carbide. When the reaction product of the active metal element and ceramics does not contain nitride, silicate or carbide, then strength of the junction becomes unstable.

Main component of the brazing material is preferably one of Ni, Au—Ni, Ag—Cu, Ag—Cu—In and Au—Cu so as to keep the composition corresponding to 1200° C. or lower in liquidus.

The state of the reaction layer in a region from the interface of junction to a depth of 0.1 μm has great influence on the strength of junction. Therefore, it is preferable that content of oxide of the active metal in the reaction layer in the region from the interface of junction to a depth of 0.1 μm is in a range from 0.5 to 90%. When that content of oxide of the active metal in the reaction layer in the region from the interface of junction to a depth of 0.1 μm is higher than 90 atomic %, the junction has low bonding strength and may come off in the interface of bonding under external force. Keeping the oxide content to below 0.5 atomic %, on the other hand, requires a complicated treatment of the active metal powder and complex heat treatment conditions in vacuum, and very high manufacturing cost. Preferably, content of oxide in the reaction layer is controlled in a range from 0.5 to 30%, in order to achieve more stable junction.

Based on the above discussion, preferable bonding method according to this embodiment is as follows. A metal paste, that contains a metal as main component in composition corresponding to 1200° C. or lower in liquidus and at least one kind of V, Ti Zr and Hf as active metal, is applied to the surface of non-oxide ceramics and fired in vacuum. This process forms the reaction layer on the surface of non-oxide ceramics, so that the non-oxide ceramics and a metal plate can be bonded together via the reaction layer.

The active metal is preferably a metal element V, Ti, Zr, Hf or hydrogen compound thereof having particle size in a range from 0.5 to 100 μm. This makes it possible to obtain a junction that has stable bonding and high bonding strength. In case an active metal powder having particle size of 0.5 μm or less is used, the surface of the powder particle can be easily oxidized due to high activity of the surface, thus resulting in shortage of the active metal element that reacts with the ceramics. In case an active metal powder having particle size of 100 μm or larger is used, on the other hand, the active metal powder cannot be dispersed favorably and the state of junction with the ceramics tends to vary.

The process of baking the brazing material is preferably carried out in vacuum of pressure in a range from 1.33 to $1.33 \times 10^{-5}$ Pa. When the pressure is higher than 1.33 Pa, the active metal element is oxidized through reaction with oxygen in the atmosphere and desired bonding strength cannot be obtained. When the baking process is carried out in vacuum of pressure lower than $1.33 \times 10^{-5}$ Pa, it requires higher manufacturing cost and evaporation of the component of the brazing material due to the high vacuum causes the composition of the brazing material to change. Therefore, the baking process is preferably carried out in vacuum of pressure in a range from 1.33 to $1.33 \times 10^{-5}$ Pa, more preferably from $1.33 \times 10^{-1}$ to $1.33 \times 10^{-4}$ Pa, which enables it to obtain more stable junction.

The brazing material layer 24 that is formed as described above must bond with the ceramic body 22 via the reaction layer 30 and, at the same time, electrically connect to the lead-out section 23d. It is preferable that the metal plate 25 is bonded in a region of 20 to 80% of the brazing material layer 24 in surface area.

While description of the embodiment described above deals with the case where the ceramic body 22 is made of silicon nitride and the active metal element is vanadium, similar effects can be achieved with a combination of other non-oxide ceramics and active metal. For example, the ceramic body 22 may be other non-oxide ceramics such as aluminum nitride or silicon carbide. Similar effects can also be achieved when the active metal is Ti, Zr or Hf.

Constitution of the ceramic body 22, the heating element 23a, the second lead section 23b, the lead section 23c, the lead-out section 23d, etc. is not limited to that of this embodiment described above. For example, the ceramic body 22 may have any shape such as block besides cylinder.

Fourth Embodiment

In this embodiment, method of improving reliability by controlling the radius of curvature of the ceramic body 22 and the metal plate 25 will be described for the ceramic heater comprising the metal plate 25 connected via the brazing material 24 to the lead-out section of the ceramic body 22 having cylindrical shape as described in the third embodiment.

Figure 8:
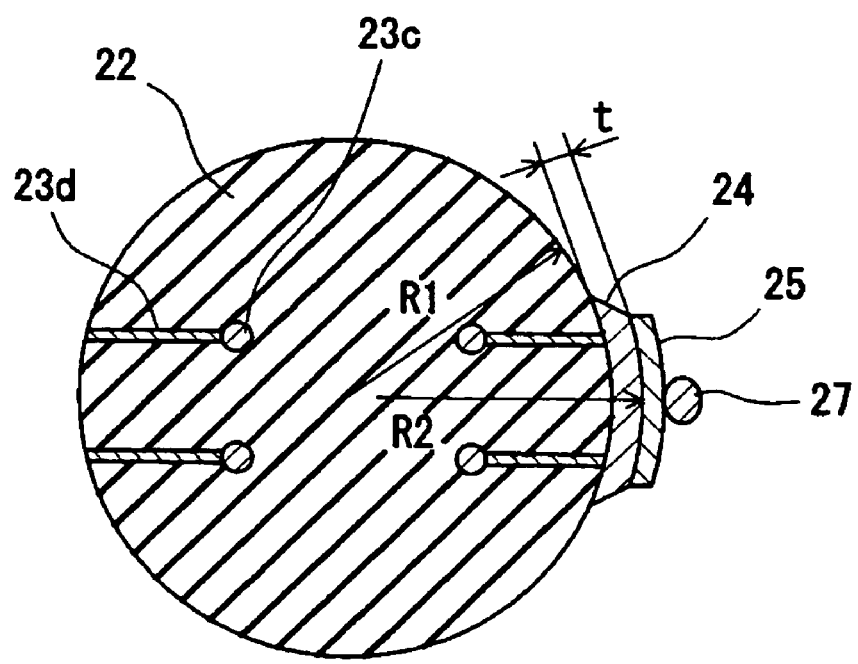
FIG. 8 is a sectional view of the ceramic heater showing the relationship between radii of curvature of the ceramic body 22 and the metal plate 25.

FIG. 8 is a sectional view of a key portion of the ceramic heater 1 having tube-like or cylindrical shape shown in FIG. 5A and FIG. 5B. It is preferable that radius $R_1$ (mm) of curvature of the ceramic body 22, radius $R_2$ (mm) of curvature of inner surface of the metal plate 25 and mean thickness t (mm) of the brazing material layer 24 satisfy the following relationship 1.

$$-0.1 \leq (R_1 - R_2) < t \qquad \text{(Relation 1)}$$

When this relationship is satisfied, surface tension of the brazing material 24 that is melted pulls the metal plate 25 toward the ceramic body 22 when bonding the metal plate 25 to the ceramic body 22 via the brazing material 24. As a result, the brazing material layer 24 becomes thinner along the periphery of the metal plate 25, making it easier to mitigate the stress generated by the difference in thermal expansion coefficient between the brazing material 24, the metal plate 25 and the ceramic body 22. As a result, high durability is achieved against thermal cycle during operation.

Satisfying the relation described above makes it necessary to precisely control the quantity of the brazing material 24 as well as to control the shapes of the ceramic body 22 and the metal plate 25. For example, it is preferable to control the amount of the brazing material 24 to be applied to within a range of +15% of the volume given by (mean thickness of the brazing material layer 24)×(area of the brazing material layer 24). Mean thickness t of the brazing material layer 24 is a mean value of thickness of the metal plate 25 on the periphery thereof and thickness of the metal plate 25 at the center thereof. In case the reaction layer is formed between the brazing material 24 and the ceramic body 22, mean thickness t of the brazing material layer 24 includes the thickness of the reaction layer.

When $(R_1-R_2)$ is smaller than −0.1 mm, the brazing material layer 24 is less likely to be formed over the entire surface of the metal plate 25, and cavities may be formed in the brazing material layer 24 thus causing cracks to be generated due to stress concentration. When $(R_1-R_2)$ is larger than t (mm), the edge of the metal plate 25 and the ceramic body 22 are separated by a large space which leads to a large thickness of the brazing material layer 24 at the edge of the metal plate 25, thus causing cracks due to residual stress caused by the difference in thermal expansion coefficient between the ceramic body 22 and the brazing material 24.

The metal plate 25 connected to the lead fixture 27 provided for lead-out made be from any material as long as it can mitigate the difference in thermal expansion with the ceramic body 22 that occurs during the cooling process after being heated for bonding with the brazing material 24 that contains the active metal and during heating and cooling cycle of operation. Thermal expansion coefficient of the metal plate 25 is preferably in a range from 3.0 to $7.5 \times 10^{-6}/°$ C., being approximate to that of the ceramic body 22 that is from 3.0 to $5.4 \times 10^{-6}/°$ C.

The metal plate 25 is preferably made of an alloy based on iron (Fe) such as Fe—Ni—Co or Fe—Ni having Young's modulus of 14 to $15 \times 10^3$ kg/mm², for the reason of the ease of undergoing plastic deformation. For the purpose of effectively absorb the stress, that is caused by the difference in thermal expansion, through plastic deformation of the metal plate 25, it is preferable to chamfer or round the corners of the metal plate 25 so as to avoid stress concentration.

In order to prevent the stress caused by the difference in thermal expansion from concentrating in a small area, it is preferable that the metal plate is bonded over 20% or more of the surface area of the brazing material layer 24. When the contact area exceeds 80%, periphery of the contact area of the metal plate 25 where stress is concentrated and the periphery of the brazing material layer 24 come nearer to each other, and cracks become more likely to occur due to stress concentration. The contact area between the metal plate 25 and the brazing material layer 24 is preferably in a range from 20 to 80% of the surface area of the brazing material layer 24. It is also preferable that periphery of the contact area between the metal plate 25 and the brazing material layer 24 does not overlap any edge of the periphery of the brazing material layer 24.

While the lead-out section 23d may be exposed as machined, reliability of connection can be further improved by coating with a metal such as Ni and forming the brazing material layer 24 thereon. Ni wire or the like having low thermal expansion coefficient may be used as the lead fixture 27 that connects to the metal plate 25.

Thickness of the brazing material layer 24 located between the metal plate 25 and the ceramic body 22 is preferably from 30 to 150 μm along the periphery of the metal plate 25. When thickness of the brazing material layer 24 is larger than 150 μm, cracks tend to occur due to the thermal stress caused by the difference in thermal expansion. When thickness of the brazing material layer 24 is less than 30 μm, cavities tend to be generated in the brazing material layer 24 since the quantity of the metal that forms the brazing material layer 24 decreases. It also leads to such a problem as, in case the lead fixture 27 is lifted in the junction thereof from the metal plate 25, the lead fixture 27 is pulled off by the stress acting thereon.

According to this embodiment, the brazing material 24 may be constituted from Au—Cu alloy or Au—Cu alloy and Au—Ni alloy in total content of 90 to 99% by weight, and from 1 to 10% by weight of at least one kind of V, Mo, Ti, Zr, Hf and Mn as active metal. The active metal may be contained in the form of nitride, carbide, hydrogenated compound thereof or the like. This constitution improves durability of the ceramic heater 1 against thermal cycle during operation. It is preferable that vanadium (V) or titanium (Ti) is contained as the active metal.

Content of the active metal less than 1% by weight cannot achieve the effect of improving the bonding strength. Content of the active metal higher than 10% leads to higher baking temperature of the metal layer 7, and causes cracks due to significant residual stress when cooled down. Therefore, content of the active metal is preferably from 1 to 10% by weight, and more preferably from 1 to 5% by weight. In view of preventing short circuiting from occurring due to migration, it is most preferable that the brazing material 24 contains Au.

According to this embodiment, the ceramic body 22 may be formed from oxide ceramics such as alumina or mullite, besides non-oxide ceramics such as silicon nitride ceramics or aluminum nitride ceramics. However, it is effective in suppressing cracks from occurring in the ceramic body 22 formed from non-oxide ceramics, to satisfy the relationship of the radius of curvature described in this embodiment.

Silicon nitride ceramics often contains crystal phase or glass phase that contains an element of group IIIa of the periodic table that is used as sintering additive or silicon in the grain boundary thereof. It is preferable that crystal phase consisting of monosilicate ($RE_2SiO_5$) or disilicate ($RE_2Si_2O_7$) precipitated as the main phase in the grain boundary. This is because precipitation of monosilicate or disilicate improves oxidation resistance of the ceramic body 22 at high temperatures. Molar ratio of total content of rare earth elements converted to equivalent oxide and the content of impurity oxygen converted to equivalent $SiO_2$ is preferably 2 or higher so as to ensure oxidation resistance, and not higher than 5 in order to make dense sintered material.

The component of the inorganic electrically conductive material that constitutes the heating element 23a may be added in a small quantity to the non-oxide ceramics, so as to control the difference in thermal expansion and reactivity between the heating element 23a and the ceramic body 22.

In order to control the growth of grains of the inorganic electrically conductive material 23a so as to prevent cracks from occurring due to the difference in thermal expansion from the ceramic body 22 and prevent resistance from increasing, the inorganic electrically conductive material 23a that constitutes the heating element may contain at least one kind of silicon nitride, boron nitride, aluminum nitride and silicon carbide, of which content is preferably, for example, 5 to 30 weight parts of silicon nitride, 1 to 20 weight parts of boron nitride (BN), 1 to 15 weight parts of aluminum nitride and 3 to 15 weight parts of silicon carbide for 100 weight parts of the main component.

The inorganic electrically conductive material that constitutes the heating element 23a preferably contains metal having high melting point such as W, Mo and Ti and carbide, silicate, nitride or the like of the metal having high melting point such as WC, $MoSi_2$, TiN or the like as the main component. It is preferable to contain WC or W as the main component in order to minimize the difference in thermal expansion from the ceramic body 22 and achieve less reactivity with them at high temperatures.

The ceramic heater 1 of this embodiment is not limited to the form described above. The brazing material layer 24 and the metal plate 25 may be of any shapes within the scope of the present invention. Shape of the cross section of the ceramic body 22 may also be altered according to the application. Similar effects can also be achieved by applying to such a structure as a plurality of the heating elements 23a are disposed in parallel to each other in multi-layer structure and the heating elements 23a are connected to each other in series or parallel.

EXAMPLE 1

The ceramic heater 1 shown in FIG. 1A was made in this Example. The ceramic sheet 9 containing $Al_2O_3$ as the main component and 10% by weight in total of $SiO_2$, CaO, MgO and $ZrO_2$ as the sintering additive was prepared as the ceramic body 2. The heat generating resistor 3 made of W—Re and the lead-out section 3a made of W were printed on the ceramic sheet. The electrode pad 4 was printed on the back surface of the ceramic sheet 9. The heat generating resistor 3 was formed in a reciprocating pattern wrapping around four times with the heating section being 5 mm in length.

A through hole was formed in the ceramic body 2 at the end of the lead-out section 3a made of W. The through hole was filled a paste thereby electrically connecting the electrode pad 4 and the lead-out section 3a. Position of the through hole was set so as to be disposed inside of the junction after baking.

Then after forming a coating layer, from substantially the same composition as that of the ceramic sheet 9, on the surface of the heat generating resistor 3 and fully drying, an adhesion liquid having ceramics having substantially the same composition as that of the ceramic sheet 9 dispersed therein was applied. The ceramic sheet 9 thus prepared was put around into contact with the ceramic core 10 and was fired at a temperature from 1500 to 1600° C.

After forming the plating layer 5 from Ni to a thickness of 3 μm on the surface of the electrode pad 4, heat treatment was applied while changing the temperature in a range from 600 to 1300° C. in a reducing atmosphere with partial pressure of steam varying in a range from 600 to 6000 Pa. Samples were also made without applying heat treatment as comparative example.

Then the lead member 7 formed from Ni as main component with diameter of 0.8 mm was bonded by using the brazing material 6 made of Au—Cu and was baked at 830° C. in reducing atmosphere, thereby to make a sample of the ceramic heater. Boron and carbon deposited on the surface of the plating layer 5 were quantitatively analyzed by Auger analysis on each sample. A photograph was taken of the meniscus of the brazing material 6 in the junction of the lead member 7 on each sample, and length and width were measured from the photograph.

With each sample being put into a thermostat held at 350° C. for 5 minutes and was, after the temperature has stabilized, quenched and then put into a thermostat again. This cycle was repeated 2000 times in a thermal cycle test. Durability test was also conducted wherein the sample was left to stand in a thermostat held at 500° C. for 500 hours. Tensile strength of the lead member 7 was measured by using a tensile strength tester on each sample after the durability test. Tensile strength was measured by pulling the lead member 7 in a direction perpendicular to the surface of the ceramic body 2. This test corresponds to an accelerated test for thermal cycle during operation.

The results are shown in Table 1.

TABLE 1

| Sample No. | Heat treatment temperature (° C.) | Partial pressure of steam Pa | B content (% by weight) | C content (% by weight) | Longitudinal flow of brazing material (mm), average of 10 samples | Lateral flow of brazing material (mm), average of 10 samples | Durability of junction, average of 10 samples (N) |
|---|---|---|---|---|---|---|---|
| *1 | No heat treatment | — | 3.4 | 13.2 | 2.41 | 1.31 | 12 |
| *2 | 600 | 800 | 3.1 | 12.1 | 2.42 | 1.32 | 13 |
| *3 | 800 | 800 | 1.4 | 10.8 | 2.45 | 1.39 | 16 |
| 4 | 800 | 900 | 0.9 | 8.8 | 2.51 | 1.42 | 25 |
| 5 | 780 | 1200 | 0.5 | 3.6 | 2.63 | 1.43 | 33 |
| 6 | 800 | 2000 | 0.35 | 2.7 | 2.71 | 1.45 | 38 |
| 7 | 800 | 3200 | 0.28 | 0.8 | 2.82 | 1.5 | 44 |
| 8 | 800 | 6000 | 0.13 | 0.12 | 2.88 | 1.53 | 52 |
| 9 | 900 | 900 | 0.42 | 6.8 | 2.68 | 1.44 | 36 |
| 10 | 1000 | 900 | 0.12 | 2.3 | 2.88 | 1.53 | 48 |
| 11 | 1000 | 2000 | 0.08 | 0.4 | 2.9 | 1.55 | 52 |
| 12 | 1050 | 2000 | 0 | 0.2 | 2.91 | 1.55 | 55 |
| 13 | 1050 | 3200 | 0 | 0.11 | 2.92 | 1.55 | 54 |
| 14 | 1200 | 2000 | 0 | 0.05 or less | 2.92 | 1.55 | 54 |

TABLE 1-continued

| Sample No. | Heat treatment temperature (° C.) | Partial pressure of steam Pa | B content (% by weight) | C content (% by weight) | Longitudinal flow of brazing material (mm), average of 10 samples | Lateral flow of brazing material (mm), average of 10 samples | Durability of junction, average of 10 samples (N) |
|---|---|---|---|---|---|---|---|
| 15 | 1300 | 2000 | 0 | 0.05 or less | 2.51 | 1.45 | 34 |

Samples marked with * are out of the scope of the invention.

As can be seen from Table 1, samples Nos. 4 through 14 that contained 1.0% by weight or less boron in the surface of the plating layer had meniscus of the brazing material measuring 2.51 mm or more in length and 1.42 mm or more in width. The lead member after the durability test showed bonding strength of 20 N or more, thus proving high durability. Samples Nos. 7, 8 and 10 through 14, in particular, that contained 0.3% by weight or less boron had large meniscus of the brazing material measuring 2.82 mm or more in length and 1.5 mm or more in width, and showed high bonding strength of 40 N or more after the durability test. Moreover, samples Nos. 8 and 11 through 14 that contained 0.1% by weight or less boron showed even higher bonding strength of 50 N or more.

It was found that meniscus of the brazing material can be made large and bonding strength of the lead member can be made high after the durability test when the heat treatment is carried out at a temperature in a range from 800 to 1200° C. with partial pressure of steam not lower than 900 Pa.

Samples Nos. 1 through 3 that contained more than 1.0% by weight of boron in the surface of the plating layer, in contrast, showed significantly lower bonding strength of less than 20 N after the durability test, compared to mean value of the initial bonding strength of 100 N. In sample No. 15 that was subjected to heat treatment at 1300° C., the electrode pad made of W and the plating layer made of Ni reacted with each other resulted in discoloration of the plating layer, and therefore the test was interrupted.

Samples Nos. 4 through 14, that contained 10% by weight or less carbon in the surface of the plating layer, showed high durability with bonding strength higher than 20 N after the durability test. Samples Nos. 7, 8 and 11 through 14, that contained 2.5% by weight or less carbon, showed bonding strength higher than 40 N after the durability test. Samples Nos. 1 through 3, that contained more than 10% by weight of carbon, in contrast, showed bonding strength lower than 20 N after the durability test.

EXAMPLE 2

The ceramic heater shown in FIG. 1A was made in this Example. The ceramic sheet 9 containing $Al_2O_3$ as the main component and 10% by weight in total of $SiO_2$, CaO, MgO and $ZrO_2$ was prepared. The heat generating resistor 3 made of W—Re and the lead-out section 3a made of W were printed on the ceramic sheet. The electrode pad 4 was printed on the back surface of the ceramic sheet 9. The heat generating resistor 3 was formed in a reciprocating pattern wrapping around four times with the heating section being 5 mm in length.

A through hole was formed in the ceramic sheet 9 at the end of the lead-out section 3a made of W. The through hole was filled a paste thereby to electrically connect the lead-out section 3a and the electrode pad 4 with each other. Position of the through hole was set so as to be disposed inside of the brazed junction when subjected to brazing. The ceramic sheet 9 thus prepared was put around and in close contact with a ceramic rod 10 and was fired at a temperature from 1500 to 1600° C., thereby to make the ceramic heater 1.

Then activation treatment was applied to the surface of the electrode pad 4 using an activation liquid containing Pd, to form a primary plating layer 4 by electroless plating of Ni to a thickness of 3 μm. The lead member 7 made of Fe—Ni—Co alloy was brazed using Au—Cu brazing material at 120° C. Then the secondary plating layer 8 was formed by electroless plating of Ni to a thickness of 6 μm. Heat treatment was applied in the presence of $H_2$—$N_2$ gas stream while changing the temperature to 600° C., 700° C., 800° C. and 900° C. to make 50 samples at each temperature. The samples subjected to heat treatment were polished with cloth in the direction of lateral cutting, thereby making the analysis samples.

Thickness of the secondary plating layer 8 and the layer 8b formed by diffusing the brazing material 6 component in the secondary plating layer 8 were measured by Auger electron spectroscopy analysis (scanning type FE Auger electron spectroscopy analyzer Model 680 manufactured by PHI; 5 kV in acceleration voltage and 10 nA in sample current).

The results of the measurements are shown in Table 2.

TABLE 2

| | Sample No. | Heat treatment temperature [° C.] | Thickness t1 without diffusion of brazing material [μm] | Thickness t2 with diffusion of brazing material [μm] |
|---|---|---|---|---|
| * | 1 | None | 5 | 0 |
| * | 2 | 500 | 4.9 | 0.1 |
|   | 3 | 600 | 4 | 1.0 |
|   | 4 | 650 | 2.6 | 1.4 |
|   | 5 | 700 | 2.9 | 2.1 |
|   | 6 | 750 | 2 | 3 |
|   | 7 | 800 | 1.5 | 3.5 |
| * | 8 | 850 | 0.5 | 4.5 |
| * | 9 | 900 | 0.1 | 4.9 |
| * | 10 | 950 | 0 | 5 |

Samples marked with * are out of the scope of the invention.

As can be seen from Table 2, diffusion of the component contained in the brazing material 6 was not observed in the secondary plating layer 8 at low heat treatment temperatures. As the heat treatment temperature became higher, diffusion of Cu, that is the element contained in the brazing material 6, was observed in the secondary plating layer 8.

Heat treatment applied after the secondary plating has the purpose of improving the adhesion between the secondary plating layer 8 and the brazing material 6. In order to verify the effect, bending test of the lead member 7 was conducted on each sample to see whether the secondary plating layer 8 would come off or not. Specifically, the lead member 7 was bent 90° and returned to the initial straight state three times, and was observed by magnifying 10 times under a binocular microscope to see whether the secondary plating layer 11 had come off or not.

The results are shown in Table 3.

TABLE 3

| Sample No. | Heat treatment temperature [° C.] | Peel-off of plating after bending |
|---|---|---|
| 1 | None | Peeled off |
| 2 | 500 | Peeled off |
| 3 | 600 | No |
| 4 | 650 | No |
| 5 | 700 | No |
| 6 | 750 | No |
| 7 | 800 | No |
| 8 | 850 | No |
| 9 | 900 | No |
| 10 | 950 | No |

As can be seen from Table 3, it was verified that the secondary plating layer 8 peeled off the lead member 7 after bending the lead member 7, in samples that were subjected to heat treatment at low temperatures. Samples Nos. 1 and 2, that were subjected to heat treatment at temperatures lower than 500° C., showed insufficient effect of heat treatment because diffusion layer of the brazing material 6 was not formed in the secondary plating layer 8, indicating that adhesiveness between the secondary plating layer 8 and the brazing material 6 was not improved. Samples Nos. 3 through 10, that were subjected to heat treatment at temperatures of 600° C. or higher, in contrast, showed no peel-off of the Ni plating. This is supposedly because the diffusion layer that improves the adhesion was formed.

The influence of the quantity of the component of the brazing material 6, that has diffused into the Ni plating, on the quality was examined by conducting cycle test in 400° C.-R.T atmosphere. After the test, presence of crack in the surface and tensile strength of the lead member 7 were checked.

The results are shown in Table 4.

TABLE 4

| | | After 400° C.-3000 cycle | |
|---|---|---|---|
| Sample No. | Heat treatment temperature [° C.] | Presence of crack | Tensile strength of brazed portion |
| 1 | None | No | 2.0 Kgf |
| 2 | 500 | No | 2.5 Kgf |
| 3 | 600 | No | 4.0 Kgf |
| 4 | 650 | No | 4.3 Kgf |
| 5 | 700 | No | 4.7 Kgf |
| 6 | 750 | No | 5.1 Kgf |
| 7 | 800 | No | 5.0 Kgf |
| 8 | 850 | Present | 2.0 Kgf |
| 9 | 900 | Present | 1.8 Kgf |
| 10 | 950 | Present | 2.0 Kgf |

As can be seen from Table 4, samples Nos. 8, 9 and 10 in which the layer where the component of the brazing material was not diffused was not thicker than 1 μm in the secondary plating layer 8 showed decrease in the tensile strength of the lead member 7 after the high temperature durability test, because too much component of the brazing material 6 was diffused in the plating. Observation of the sample showed cracks in the surface of the secondary plating layer 8.

EXAMPLE 3

In this Example, bonding strength was evaluated for the method of bonding the non-oxide ceramics and the metal plate described in the third embodiment.

EXPERIMENT 1

Samples were made as follows.

Cylindrical ceramic body formed mainly from silicon nitride and cylindrical metal member formed from Fe—Ni—Co alloy were prepared, and end faces to be joined were polished with #600 grinding wheel. Powder was prepared by mixing 96% by weight of Ni powder having particle size of 1 μm and 4% by weight of active metal powder of V, Ti, Zr and Hf having particle size of 1 μm. The mixed powder, organic binder and a solvent were mixed to form a paste. The paste was applied to the interface of bonding the ceramics to a thickness of 0.2 mm. A brazing material was applied to a metal layer obtained by drying the paste, and the metal member was placed thereon and, after being secured and fully dried, brazing operation was carried out in a vacuum furnace.

On the samples obtained as described above, bonding strength was measured and the state of the active metal elements in the reaction layer was examined by ESCA. Bonding strength was evaluated by applying a tensile load on the layer in the direction perpendicular to the layer to see whether the layer peeled off or not. The results are shown in Table 5.

TABLE 5

| | | | Conditions | | | | | | |
|---|---|---|---|---|---|---|---|---|---|
| Sample No. | Active metal | Composition of active metal | Proportion of oxide of the active metal element in reaction layer (atomic %) | State of reaction of active metal element in bonding interface | | | Grain size (μm) | Degree of vacuum (Pa) | Effect Bonding strength |
| 1 | * | None | — | — | — | — | — | — | $1.33 \times 10^{-1}$ | D |
| 2 | * | V | V (Metal) | 95 | Oxide | Nitride | Silicate | 1 | $1.33 \times 10^{1}$ | D |
| 3 | | V | V (Metal) | 60 | Oxide | Nitride | Silicate | 1 | $1.33 \times 10^{-1}$ | B |
| 4 | | V | V (Metal) | 30 | Oxide | Nitride | Silicate | 1 | $1.33 \times 10^{-3}$ | A |
| 5 | * | V | VHx (Hydrogen compound) | 92 | Oxide | Nitride | Silicate | 1 | $1.33 \times 10^{1}$ | D |
| 6 | | V | VHx (Hydrogen compound) | 58 | Oxide | Nitride | Silicate | 1 | $1.33 \times 10^{-1}$ | B |
| 7 | | V | VHx (Hydrogen compound) | 30 | Oxide | Nitride | Silicate | 1 | $1.33 \times 10^{-3}$ | A |
| 8 | | V | VHx (Hydrogen compound) | 2 | Oxide | Nitride | Silicate | 1 | $1.33 \times 10^{-6}$ | C |
| 9 | * | V | VOx (Oxide) | 96 | Oxide | Nitride | Silicate | 1 | $1.33 \times 10^{1}$ | D |
| 10 | * | V | VOx (Oxide) | 93 | Oxide | Nitride | Silicate | 1 | $1.33 \times 10^{-1}$ | D |
| 11 | | V | VOx (Oxide) | 87 | Oxide | Nitride | Silicate | 1 | $1.33 \times 10^{-3}$ | B |

TABLE 5-continued

| Sample No. | Active metal | Composition of active metal | Proportion of oxide of the active metal element in reaction layer (atomic %) | State of reaction of active metal element in bonding interface | | | Grain size (μm) | Degree of vacuum (Pa) | Effect Bonding strength |
|---|---|---|---|---|---|---|---|---|---|
| 12 | Ti | TiHx (Hydrogen compound) | 43 | Oxide | Nitride | Silicate | 1 | $1.33 \times 10^{-3}$ | A |
| 13 | Zr | ZrHx (Hydrogen compound) | 38 | Oxide | Nitride | Silicate | 1 | $1.33 \times 10^{-3}$ | A |
| 14 | Hf | HfHx (Hydrogen compound) | 40 | Oxide | Nitride | Silicate | 1 | $1.33 \times 10^{-3}$ | A |

Samples marked with * are out of the scope of the invention.
A—50 N or higher
B—30 N or higher, lower than 50 N
C—20 N or higher, lower than 30 N
D—Lower than 20 N As can be seen from Table 5, samples Nos. 3, 4, 6, 7 and 11 through 14 in which the proportion of oxide of the active metal in the reaction layer was in a range from 5 to 90 atomic % showed good bonding condition with sufficient levels of bonding strength. In samples Nos. 2, 5, 9 and 10, in which the proportion of oxide of the active metal in the reaction layer exceeded 90 atomic %, sufficient levels of bonding strength could not be obtained. In sample No. 8 in which the proportion of oxide of the active metal in the reaction layer was less than 5 atomic %, it required high vacuum in the treatment of powder and baking treatment. Sample No. 1 that did not use active metal also showed insufficient strength.

EXPERIMENT 2

In Experiment 2, samples similar to those of Experiment 1 were made, of which bonding strength was measured and the state of the active metal elements in the reaction layer at a depth of 0.1 μm from the interface of junction with the ceramic body was examined by ESCA.

The results are shown in Table 6.

TABLE 6

| Sample No. | Active metal | Composition of active metal | Proportion of oxide of the active metal element in reaction layer (atomic %) | State of reaction of active metal element in reaction layer | | | Grain size (μm) | Degree of vacuum (Pa) | Effect Bonding strength |
|---|---|---|---|---|---|---|---|---|---|
| 15 | V | V (Metal) | 92 | Oxide | Nitride | Silicate | — | $1.33 \times 10^{1}$ | B |
| 16 | V | V (Metal) | 40 | Oxide | Nitride | Silicate | 1 | $1.33 \times 10^{-1}$ | A |
| 17 | V | V (Metal) | 10 | Oxide | Nitride | Silicate | 1 | $1.33 \times 10^{-3}$ | A |
| 18 | V | VHx (Hydrogen compound) | 92 | Oxide | Nitride | Silicate | 1 | $1.33 \times 10^{1}$ | B |
| 19 | V | VHx (Hydrogen compound) | 30 | Oxide | Nitride | Silicate | 1 | $1.33 \times 10^{-1}$ | A |
| 20 | V | VHx (Hydrogen compound) | 13 | Oxide | Nitride | Silicate | 1 | $1.33 \times 10^{-3}$ | A |
| 21 | V | VHx (Hydrogen compound) | 0.2 | Oxide | Nitride | Silicate | 1 | $1.33 \times 10^{-6}$ | A |
| 22 | V | VOx (Oxide) | 94 | Oxide | Nitride | Silicate | 1 | $1.33 \times 10^{1}$ | A |
| 23 | V | VOx (Oxide) | 91 | Oxide | Nitride | Silicate | 1 | $1.33 \times 10^{-1}$ | A |
| 24 | V | VOx (Oxide) | 60 | Oxide | Nitride | Silicate | 1 | $1.33 \times 10^{-3}$ | B |

Samples marked with * are out of the scope of the invention.

A—50 N or higher

B—30 N or higher, lower than 50 N

C—20 N or higher, lower than 30 N

D—Lower than 20 N

As can be seen from Table 6, samples Nos. 16, 17, 19 through 21 and 24 in which the proportion of oxide of the active metal in the reaction layer was in a range from 0.5 to 90 atomic % showed good bonding condition with sufficient levels of bonding strength.

In samples Nos. 15, 18, 22 and 23, in which the proportion of oxide of the active metal in the reaction layer exceeded 90 atomic %, bonding strength was at somewhat low levels but did not show a problem in practical application. In sample No. 21 in which the proportion of oxide of the active metal in the reaction layer was less than 0.5 atomic %, it required high vacuum in the treatment of powder and baking treatment.

EXPERIMENT 3

In Experiment 3, samples similar to those of Experiment 1 were made while changing the reacting condition of the active metal elements and the particle size. For each sample, bonding strength was measured, the state of the active metal elements in the reaction layer in the interface of junction was examined by ESCA, and distribution of the active metal element in the bonding surface was examined by EPMA.

The results are shown in Table 7.

TABLE 7

| | | | Conditions | | | | | | | | Effect |
|---|---|---|---|---|---|---|---|---|---|---|---|
| Sample No. | | Active metal | Composition of active metal | Proportion of oxide of the active metal element in reaction layer (atomic %) | State of reaction of active metal element in reaction layer | | | Grain size (μm) | Degree of vacuum (Pa) | Brazing material | Brazing temperature | Bonding strength |
| 25 | | V | V (Metal) | 60 | Oxide | Nitride | Silicate | 1 | 1.33 | Ag—Cu | 1000 | B |
| 26 | | V | V (Metal) | 58 | Oxide | Nitride | Silicate | 5 | 1.33 | Ag—Cu | 1000 | B |
| 27 | | V | V (Metal) | 56 | Oxide | Nitride | Silicate | 10 | 1.33 | Ag—Cu | 1000 | B |
| 28 | * | V | VHx (Hydrogen compound) | 94 | Oxide | Nitride | Silicate | 0.1 | 1.33 | Ag—Cu | 1000 | D |
| 29 | * | V | VHx (Hydrogen compound) | 94 | Oxide | Nitride | Silicate | 0.2 | 1.33 | Ag—Cu | 1000 | D |
| 30 | * | V | VHx (Hydrogen compound) | 92 | Oxide | Nitride | Silicate | 0.3 | 1.33 | Ag—Cu | 1000 | D |
| 31 | | V | VHx (Hydrogen compound) | 73 | Oxide | Nitride | Silicate | 0.6 | 1.33 | Ag—Cu | 1000 | B |
| 32 | | V | VHx (Hydrogen compound) | 58 | Oxide | Nitride | Silicate | 1 | 1.33 | Ag—Cu | 1000 | B |
| 33 | | V | VHx (Hydrogen compound) | 57 | Oxide | Nitride | Silicate | 5 | 1.33 | Ag—Cu | 1000 | B |
| 34 | | V | VHx (Hydrogen compound) | 57 | Oxide | Nitride | Silicate | 10 | 1.33 | Ag—Cu | 1000 | B |
| 35 | | V | VHx (Hydrogen compound) | 58 | Oxide | Nitride | Silicate | 20 | 1.33 | Ag—Cu | 1000 | B |
| 36 | | V | VHx (Hydrogen compound) | 55 | Oxide | Nitride | Silicate | 50 | 1.33 | Ag—Cu | 1000 | B |
| 37 | | V | VHx (Hydrogen compound) | 54 | Oxide | Nitride | Silicate | 100 | 1.33 | Ag—Cu | 1000 | C |
| 38 | | V | VHx (Hydrogen compound) | 50 | Oxide | Nitride | Silicate | 200 | 1.33 | Ag—Cu | 1000 | C |
| 39 | | V | VHx (Hydrogen compound) | 46 | Oxide | Nitride | Silicate | 500 | 1.33 | Ag—Cu | 1000 | C |
| 40 | | V | VHx (Hydrogen compound) | 58 | Oxide | Nitride | Silicate | 1 | 1.33 | Ag—Ni | 1300 | C |
| 41 | * | V | VOx (Oxide) | 93 | Oxide | Nitride | Silicate | 1 | 1.33 | Ag—Cu | 1000 | D |
| 42 | * | V | VOx (Oxide) | 94 | Oxide | Nitride | Silicate | 5 | 1.33 | Ag—Cu | 1000 | D |
| 43 | * | V | VOx (Oxide) | 94 | Oxide | Nitride | Silicate | 10 | 1.33 | Ag—Cu | 1000 | D |

Samples marked with * are out of the scope of the invention.

A—50 N or higher

B—30 N or higher, lower than 50 N

C—20 N or higher, lower than 30 N

D—Lower than 20 N

In samples Nos. 25 through 27 and 31 through 40, in which the active metal was metal element V, Ti, Zr, Hf or hydrogen compound thereof having particle size in a range from 0.5 to 100 μm, bonded ceramic body having stable bonding condition and high bonding strength was obtained. In samples Nos. 41 through 43, in which the active metal was a powder other than metal or hydrogen compound thereof, bonding condition was unstable and sufficient bonding strength could not be obtained.

In samples Nos. 28, 29 and 30, in which the active metal having particle size smaller than 0.5 μm was used, bonding was unstable and sufficient bonding strength could not be obtained. In samples Nos. 38 and 39, in which powder of the active metal having particle size larger than 100 μm was used, the active metal was poorly dispersed and there was variation in the bonding condition with the ceramic body 40, with the bonding strength being affected.

In sample No. 40 that was made by brazing at 1200° C. or higher, component of the brazing material evaporated due to high vacuum, thus resulting in altered composition of the brazing material, and stable bonding was not obtained.

EXPERIMENT 4

In Experiment 4, samples similar to those of Experiment 1 were made while changing the degree of vacuum in the baking process. Samples were evaluated by measuring the bonding strength, examining the state of the active metal elements in the reaction layer by ESCA, and examining the distribution of the active metal element in the bonding surface by EPMA.

The results are shown in Table 8.

EXAMPLE 4

In Example 4, the ceramic heater 1 shown in FIG. 5A and FIG. 5B was made.

$Si_3N_4$ powder having specific surface area of 7 to 15 $m^2/g$ was mixed with 10 to 15% by weight of $Yb_2O_3$, an oxide of rare earth element, less than 5% by weight of $MoSi_2$ and a proper amount of $Al_2O_3$ that were added as sintering additive. $MoSi_2$, $Mo_2C$, $WSi_2$, $WO_3$, WC or the like was added as required as coloring agent or thermal expansion controlling agent. The mixed powder was subjected to wet mixing in a ball mill for 24 hours. The paste was granulated by spray drying, and the resultant granules were pressed into a flat green compact 22a.

80% by weight of fine WC powder and 20% by weight of fine $Si_3N_4$ powder were mixed, and a solvent was added to the mixture to prepare a paste. The paste was applied to the green compact 22a by screen printing to form the heating element 23a. The heating element 23a was formed in U-shaped pattern disposed at a position at a distance of 5 mm or less from the end of the sintered body.

Then a paste constituted from 92% by weight of fine WC powder and 8% by weight of BN fine powder was used to form two second leads 23b at predetermined positions so as to partially overlap with both ends of the heating element 23a. At the same time, two lead-out sections 23d were formed from a paste of the same composition as that of the second lead 23b. The lead-out sections 23d were formed in rectangular pattern parallel to each other up to the side face of the green compact 22a.

TABLE 8

| | | | Conditions | | | | | |
|---|---|---|---|---|---|---|---|---|
| Sample No. | Active metal | Composition of active metal | Proportion of oxide of the active metal element in reaction layer (atomic %) | State of reaction of active metal element in reaction layer | | | Grain size (μm) | Degree of vacuum (Pa) [×10⁻¹] | Effect Bonding strength |
| 44 | * | V | VHx (Hydrogen compound) | 94 | Oxide | Nitride | Silicate | 1 | $1.33 \times 10^1$ | D |
| 45 | | V | VHx (Hydrogen compound) | 94 | Oxide | Nitride | Silicate | 1 | 1.33 | B |
| 46 | | V | VHx (Hydrogen compound) | 58 | Oxide | Nitride | Silicate | 1 | $1.33 \times 10^{-1}$ | B |
| 47 | | V | VHx (Hydrogen compound) | 30 | Oxide | Nitride | Silicate | 1 | $1.33 \times 10^{-3}$ | B |
| 48 | | V | VHx (Hydrogen compound) | 10 | Oxide | Nitride | Silicate | 1 | $1.33 \times 10^{-5}$ | B |
| 49 | * | V | VHx (Hydrogen compound) | 2 | Oxide | Nitride | Silicate | 1 | $1.33 \times 10^{-6}$ | C |

Samples marked with * are out of the scope of the invention.
A—50 N or higher
B—30 N or higher, lower than 50 N
C—20 N or higher, lower than 30 N
D—Lower than 20 N In samples Nos. 46 through 48, in which the baking process was carried out in vacuum with pressure in a range from 1.33 to $1.33 \times 10^{-5}$ Pa, bonded ceramic body having stable bonding condition and high bonding strength was obtained. In sample No. 44, in which the baking process was carried out in vacuum with pressure higher than 1.33 Pa, the active metal element was oxidized through reaction with oxygen in the atmosphere, and desired bonding strength was not obtained. In sample No. 49, in which the baking process was carried out in vacuum with pressure lower than $1.33 \times 10^{-5}$ Pa, manufacturing cost was high, while the component of the brazing material evaporated due to high vacuum resulting in altered composition of the brazing material, and stable bonding was not obtained.

A W wire having diameter of 0.3 mm was electrically connected to the second lead 23b and the lead-out section 23d on the green compact 22a whereon the heating element 23a, the second lead 23b and the lead-out section 23d were formed by printing, and another green compact 22a was placed thereon. The assembly was subjected to hot press firing at 1780° C. in reducing atmosphere for at least 1 hour, thereby to obtain the ceramic body 22 of substantially rectangular parallelepiped shape. The ceramic body 22 of substantially rectangular parallelepiped shape was machined into cylindrical shape.

The brazing material 24 was applied in a 3 mm square area by screen printing so as to connect with the exposed portion of the lead-out section 23d of the ceramic body 22, and was baked at 1000° C. in a vacuum furnace.

The metal plate 25 made of Fe—Ni—Co alloy having the lead fixture 27 made of Ni with diameter of 0.6 mm welded thereon was placed on the brazing material layer 23, and heated at a temperature in a range from 900 to 1200° C. in a vacuum furnace to establish connection. Samples were made with various values of ($R_1$-$R_2$) by changing the radius $R_1$ of curvature of the ceramic body 22 and radius $R_2$ of curvature of inner surface of the metal plate 25 with thickness of the metal plate 25 being set to 0.20 mm.

Ceramic heater was formed from alumina in such a constitution as a heating element made of W was incorporated, electrode pad made of W, metal layer formed from Au—Cu brazing material having mean thickness of 50 μm and metal plate formed from Fe—Ni—Co alloy having mean thickness of 200 μm were provided in the lead-out section, and ($R_1$-$R_2$) was 0 mm.

The ceramic heater made as described above was evaluated by durability test in which the sample was left in an environment of 600° C. for 1000 hours, and durability test in which the sample was subjected to 10000 cooling and heating cycles each comprising exposure to 40° C. and exposure to 450° C. Connecting conditions of the metal plate 25 after the test was evaluated as follows.

Resistance of the ceramic heater 1 was measured before and after the test so as to determine the maximum change in resistance. Presence of cracks was checked around the junction of the lead-out metal plate 25 after the cooling and heating cycle test by liquid penetrant test and microscope observation.

TABLE 9

| Sample No. | R1-R2 (mm) | Thickness of metal layer t (mm) | Lead-out metal plate Material | Lead-out metal plate Proportion of contact area (%) | Durability test Change in resistance (%) | Durability test Presence of crack Present No | Remark |
|---|---|---|---|---|---|---|---|
| *1 | −0.14 | 0.100 | Fe—Ni—Co | 60 | 12.9 | Present | Alumina |
| *2 | −0.12 | 0.100 | Fe—Ni—Co | 60 | 11.5 | Present | |
| 3 | −0.10 | 0.030 | Fe—Ni—Co | 60 | 5.1 | No | |
| 4 | −0.08 | 0.100 | Fe—Ni—Co | 60 | 3.2 | No | |
| 5 | −0.04 | 0.100 | Fe—Ni—Co | 60 | 1.1 | No | |
| 6 | 0.00 | 0.100 | Fe—Ni—Co | 60 | 2.9 | No | |
| 7 | 0.15 | 0.100 | Fe—Ni—Co | 60 | 5 | No | |
| *8 | 0.17 | 0.100 | Fe—Ni—Co | 60 | 10.9 | Present | |
| *9 | 0.19 | 0.100 | Fe—Ni—Co | 60 | 12.7 | Present | |
| 10 | 0.00 | 0.120 | Fe—Ni—Co | 60 | 6.3 | No | |
| 11 | 0.00 | 0.140 | Fe—Ni—Co | 60 | 7.4 | No | |
| 12 | 0.00 | 0.150 | Fe—Ni—Co | 60 | 8.3 | No | |
| 13 | 0.00 | 0.100 | Fe—Ni—Co | 60 | 1.2 | No | |
| *14 | 0.00 | 0.160 | Fe—Ni—Co | 60 | 10.5 | Present | |
| *15 | 0.00 | 0.170 | Fe—Ni—Co | 60 | 12.1 | Present | |

Samples marked with * are out of the scope of the invention.

As will be apparent from table 9, samples Nos. 1, 2, 8, 9, 14 and 15, which had values of ($R_1$-$R_2$) that did not satisfy the relation 1, showed a significant change in resistance of 13.3% or more after the durability test, and the ceramic bodies 22 of all samples showed cracks after the durability test.

The ceramic heaters 1 which had values of ($R_1$-$R_2$) that satisfied the relation 1, in contrast, showed small change of 6.0% or less in resistance, and cracks did not occur in the ceramic body 22. Those which showed change in resistance of less than 6.0% did not develop cracks after the durability test. It was verified that stress concentration does not occur when the difference ($R_1$-$R_2$) between the radius $R_1$ of curvature of the ceramic body 22 and radius $R_2$ of curvature of inner surface of the metal plate 25 is within the range of relation 1, thus resulting in great improvement in the bonding strength of the lead-out metal plate 25.

What is claimed is:

1. A ceramic heater comprising: a ceramic body, a heat generating resistor buried in said ceramic body, an electrode pad that is electrically connected to said heat generating resistor and is formed on the surface of said ceramic body, a boron-based plating layer formed on the surface of said electrode pad having uniform thickness achievable by electroless plating, and a lead member bonded onto said plating layer by means of a brazing material,
    wherein content of boron (B) in the surface of said plating layer is 1% by weight or lower.

2. The ceramic heater according to claim 1, wherein content of carbon (C) in the surface of said plating layer is 10% by weight or lower.

3. A ceramic heater comprising: a ceramic body, a heat generating resistor buried in said ceramic body, an electrode pad that is electrically connected to said heat generating resistor and is formed on the surface of said ceramic body, a first plating layer formed on the surface of said electrode pad., a lead member bonded onto said plating layer by means of a brazing material, and a secondary plating layer that covers said brazing material,
    wherein the component of the brazing material is diffused into said secondary plating layer to a depth of 1 μm or larger, and depth of a portion from the surface of said secondary plating layer where the brazing material has not diffused therein is 1 μm or larger.

4. The ceramic heater according to claim 3, wherein grain size of said second plating layer is 5 μm or smaller.

5. A ceramic heater comprising: a ceramic body that is formed from a non-oxide material and has a tube-like or cylindrical shape; and a metal plate that has a curved share and is connected with said ceramic body via a brazing material,
    wherein a radius $R_1$ (mm) of curvature of said ceramic body in the lead-out section, a radius $R_2$ (mm) of curvature of the inner surface of said metal plate and a mean thickness t (mm) of the metal layer satisfy the relationship −0.1≦($R_1$-$R_2$) <t, wherein said brazing material includes a metal of which liquidas-line temperature is 1200° C. or lower as main component and at least one kind of V, Ti Zr and Hf as active metal;

a reaction layer is formed between said brazing material and said ceramic body through the reaction of said active metal and said ceramic body; and the proportion of oxide of the active metal in said reaction layer between the brazing material and the non-oxide ceramic material is in a range from 5 to 90 atomic %.

6. The ceramic heater according to claim 5, wherein said reaction layer contains at least one of nitride, silicate and carbide of said active layer in addition to oxide of said active metal.

7. The ceramic heater according to claim 5, wherein the main component of said brazing material is at least one kind selected from a group consisting of Ni based material, Au-Ni based material, Ag-Cu based material, Ag-Cu-In based material and Au-Cu based material.

8. The ceramic heater according to claims 5, wherein the proportion of oxide of the active metal is in a range from 0.5 to 90 atomic % in a portion of said reaction layer to a depth of 0.1 μm from the interface with said ceramic body.

9. The method for manufacturing a ceramic heater according to claim 5, wherein a metal paste that contains said active metal in the form of element or hydrogen compound thereof having particle size in a range from 0.5 to 100 μm is applied to said ceramic body, and is heated in vacuum atmosphere of which pressure is 1.33 to $1.33 \times 10^{-5}$ Pa.

10. The ceramic heater according to claim 5, wherein the thickness of the brazing material layer formed between said metal plate and the ceramic body in the periphery of said metal plate is in a range from 30 to 150 μm.

* * * * *